(12) United States Patent
Ochiai et al.

(10) Patent No.: US 10,618,371 B2
(45) Date of Patent: Apr. 14, 2020

(54) AIR CONDITIONER FOR VEHICLE

(71) Applicant: DENSO CORPORATION, Kariya, Aichi-pref. (JP)

(72) Inventors: Toshinori Ochiai, Kariya (JP); Shinya Kato, Kariya (JP); Jun Yamaoka, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 223 days.

(21) Appl. No.: 14/904,902

(22) PCT Filed: Jun. 19, 2014

(86) PCT No.: PCT/JP2014/003303
§ 371 (c)(1),
(2) Date: Jan. 13, 2016

(87) PCT Pub. No.: WO2015/008434
PCT Pub. Date: Jan. 22, 2015

(65) Prior Publication Data
US 2016/0144685 A1 May 26, 2016

(30) Foreign Application Priority Data

Jul. 18, 2013 (JP) .................................. 2013-149371
May 26, 2014 (JP) .................................. 2014-108319

(51) Int. Cl.
*B60H 1/00* (2006.01)
*B60S 1/02* (2006.01)
*B60S 1/54* (2006.01)

(52) U.S. Cl.
CPC ..... *B60H 1/00028* (2013.01); *B60H 1/00064* (2013.01); *B60H 1/00207* (2013.01);
(Continued)

(58) Field of Classification Search
CPC ............ B60H 1/00028; B60H 1/00064; B60H 1/00207; B60H 1/00564; B60H 1/00742; B60H 1/00842; B60S 1/023; B60S 1/54
See application file for complete search history.

(56) References Cited

U.S. PATENT DOCUMENTS 6,669,550 B1 * 12/2003 Urbank .................. B60H 1/247
454/121
9,597,945 B2 * 3/2017 Maranville ........ B60H 1/00742
(Continued)

FOREIGN PATENT DOCUMENTS

JP   S59137212 A   8/1984
JP   H04292216 A   10/1992
(Continued)

OTHER PUBLICATIONS

JP2012106667 MT (Year: 2012).*
(Continued)

*Primary Examiner* — Gordon A Jones
(74) *Attorney, Agent, or Firm* — Harness, Dickey & Pierce, P.L.C.

(57) ABSTRACT

An air conditioner for a vehicle includes: a casing; an air blower; and a mode switching portion switching an inlet mode to draw air into the casing and an outlet mode to blow out air to the vehicle interior. The casing has a driver seat inlet port from which air in a space adjacent to a driver seat is drawn in. The mode switching portion is configured to be switchable between a normal mode during which air drawn in from at least one of air inlets is blown out from both of a driver seat outlet and a passenger seat outlet and a driver seat mode during which air drawn in from the driver seat inlet port is blown out from the driver seat outlet. The driver seat inlet port is located in a region exposed to the space adjacent to the driver seat.

12 Claims, 15 Drawing Sheets

(52) U.S. Cl.
CPC ..... *B60H 1/00564* (2013.01); *B60H 1/00742* (2013.01); *B60H 1/00842* (2013.01); *B60S 1/023* (2013.01); *B60S 1/54* (2013.01); *B60H 2001/00135* (2013.01); *B60H 2001/00185* (2013.01); *B60H 2001/00192* (2013.01); *B60H 2001/00214* (2013.01)

(56) References Cited

U.S. PATENT DOCUMENTS

| | | | |
|---|---|---|---|
| 2001/0029162 A1* | 10/2001 | Yoshinori | B60H 1/00007 454/137 |
| 2005/0067140 A1* | 3/2005 | Sogame | B60H 1/00407 165/42 |
| 2007/0029253 A1 | 2/2007 | Schehr | |
| 2007/0045262 A1 | 3/2007 | Schehr | |
| 2008/0248736 A1* | 10/2008 | Aoki | B60H 1/00742 454/75 |

FOREIGN PATENT DOCUMENTS

| | | | |
|---|---|---|---|
| JP | 2003080921 A | 3/2003 | |
| JP | 2003136936 A | 5/2003 | |
| JP | 2005225412 A | 8/2005 | |
| JP | 2007046893 A | 2/2007 | |
| JP | 2007118630 A | 5/2007 | |
| JP | 2007137282 A | 6/2007 | |
| JP | 2008296717 A | 12/2008 | |
| JP | 2010025527 A | 2/2010 | |
| JP | 2012106667 A * | 6/2012 | ......... B60H 1/00207 |
| JP | 5018761 B2 | 9/2012 | |

OTHER PUBLICATIONS

JP 2008296717 human translation (Year: 2008).*
International Search Report and Written Opinion (in Japanese with English Translation) for PCT/JP2014/003303, dated Sep. 16, 2014; ISA/JP.

* cited by examiner

AIR CONDITIONER FOR VEHICLE

CROSS REFERENCE TO RELATED APPLICATIONS

This application is a U.S. National Phase Application under 35 U.S.C. 371 of International Application No. PCT/JP2014/003303 filed on Jun. 19, 2014 and published in Japanese as WO 2015/008434 A1 on Jan. 22, 2015. This application is based on and claims the benefit of priority from Japanese Patent Application No. 2013-149371 filed on Jul. 18, 2013 and Japanese Patent Application No. 2014-108319 filed on May 26, 2014. The entire disclosures of all of the above applications are incorporated herein by reference.

TECHNICAL FIELD

The present disclosure relates to an air conditioner that conditions air in a passenger compartment for a vehicle.

BACKGROUND ART

An air-conditioning device for a vehicle intensively air-conditions a space adjacent to a driver seat by closing an outlet adjacent to a passenger seat, such that conditioned air is blown out from an outlet adjacent to the driver seat, when an occupant is seated on the driver seat alone (see, for example, Patent Literature 1).

According to Patent Literature 1, an air-conditioning load of the air-conditioning device is reduced by configuring in such a manner that air present in the space adjacent to the driver seat is drawn in from an air inlet, which has a temperature close to a temperature of air blown out from the outlet for the driver seat.

More specifically, the air-conditioning device of Patent Literature 1 additionally includes a bypass duct which enables a communication between a face outlet for the driver seat and an inside air inlet, such that air in a vehicle interior is drawn in from the face outlet for the driver seat via the bypass duct when conditioned air is blown out from the outlet for the driver seat.

PRIOR ART LITERATURES

Patent Literature

Patent Literature 1: JP 5018761 B2

SUMMARY OF INVENTION

The air-conditioning device described in Patent Literature 1 is required to add a new exclusive-use duct (bypass duct) which enables a communication between the face outlet for the driver seat and the inside air inlet. Hence, a duct structure in the air-conditioning device becomes more complex. Such an increase in complexity of the duct structure may lower ease of installation of the air-conditioning device to a vehicle and is not preferable.

The present disclosure has an object to provide an air conditioner for a vehicle, in which an air-conditioning load can be reduced with a simple structure.

The present disclosure is directed to an air conditioner applied to a vehicle having a driver seat outlet from which air is blown out toward a driver seat in a vehicle interior and a passenger seat outlet from which air is blown out toward a passenger seat in the vehicle interior.

According to an aspect of the present disclosure, an air conditioner for a vehicle includes: a casing forming an outer shape; an air blower stored in the casing to blow air to the vehicle interior by drawing in air from at least one of a plurality of air inlets provided to the casing; and a mode switching portion switching an inlet mode to draw air into the casing and an outlet mode to blow out air to the vehicle interior. The plurality of air inlets includes a driver seat inlet port from which air in a space adjacent to the driver seat is drawn in. The mode switching portion is configured to be switchable between a normal mode during which air drawn in from at least one of the plurality of air inlets is blown out from both of the driver seat outlet and the passenger seat outlet and a driver seat mode during which air drawn in from the driver seat inlet port is blown out from the driver seat outlet. The driver seat inlet port is provided to the casing in a region exposed to the space adjacent to the driver seat.

By forming a structure switchable to the driver seat mode during which air is drawn in from the space on the driver seat where air is blown out from the driver seat outlet, a temperature difference between air to be drawn in and air to be blown out can be lessened and hence an air-conditioning load of the air-conditioning device can be reduced.

In addition, by providing the driver seat inlet to the casing in a region exposed to the space on the driver seat, air can be drawn in directly from the space on the driver seat without having to provide an exclusive-use duct.

Hence, according to the present disclosure, a vehicle air-conditioning device capable of reducing an air-conditioning load can be realized with a simple structure.

According to an aspect of the present disclosure, an air conditioner for a vehicle includes: a casing forming an outer shape; an air blower stored in the casing to blow air to the vehicle interior by drawing in air from at least one of a plurality of air inlets provided to the casing; and a mode switching portion switching an inlet mode to draw air into the casing and an outlet mode to blow out air to the vehicle interior. The plurality of air inlets includes an inside air introduction port disposed in a space adjacent to the passenger seat, from which air in the vehicle interior is drawn in, and a driver seat inlet port disposed at a position closer to the space adjacent to the driver seat than the inside air introduction port, from which air in the vehicle interior is drawn in. The mode switching portion is configured to be switchable between a normal mode during which air drawn in from at least one of the plurality of air inlets is blown out from both of the driver seat outlet and the passenger seat outlet and a driver seat mode during which air drawn in from the driver seat inlet port is blown out from the driver seat outlet.

By forming a structure switchable to the driver seat mode during which air is drawn in from the driver seat inlet disposed at a position closer to the space on the driver seat than the inside air introduction port, a temperature difference between air to be drawn in and air to be blown out can be lessened and hence an air-conditioning load of the air-conditioning device can be reduced.

In addition, by providing the driver seat inlet to the casing, an exclusive-use duct can be omitted.

Hence, according to the present disclosure, an air-conditioning device can be realized in which an air-conditioning load is reduced with a simple structure.

DESCRIPTION OF EMBODIMENTS

Figure 1:
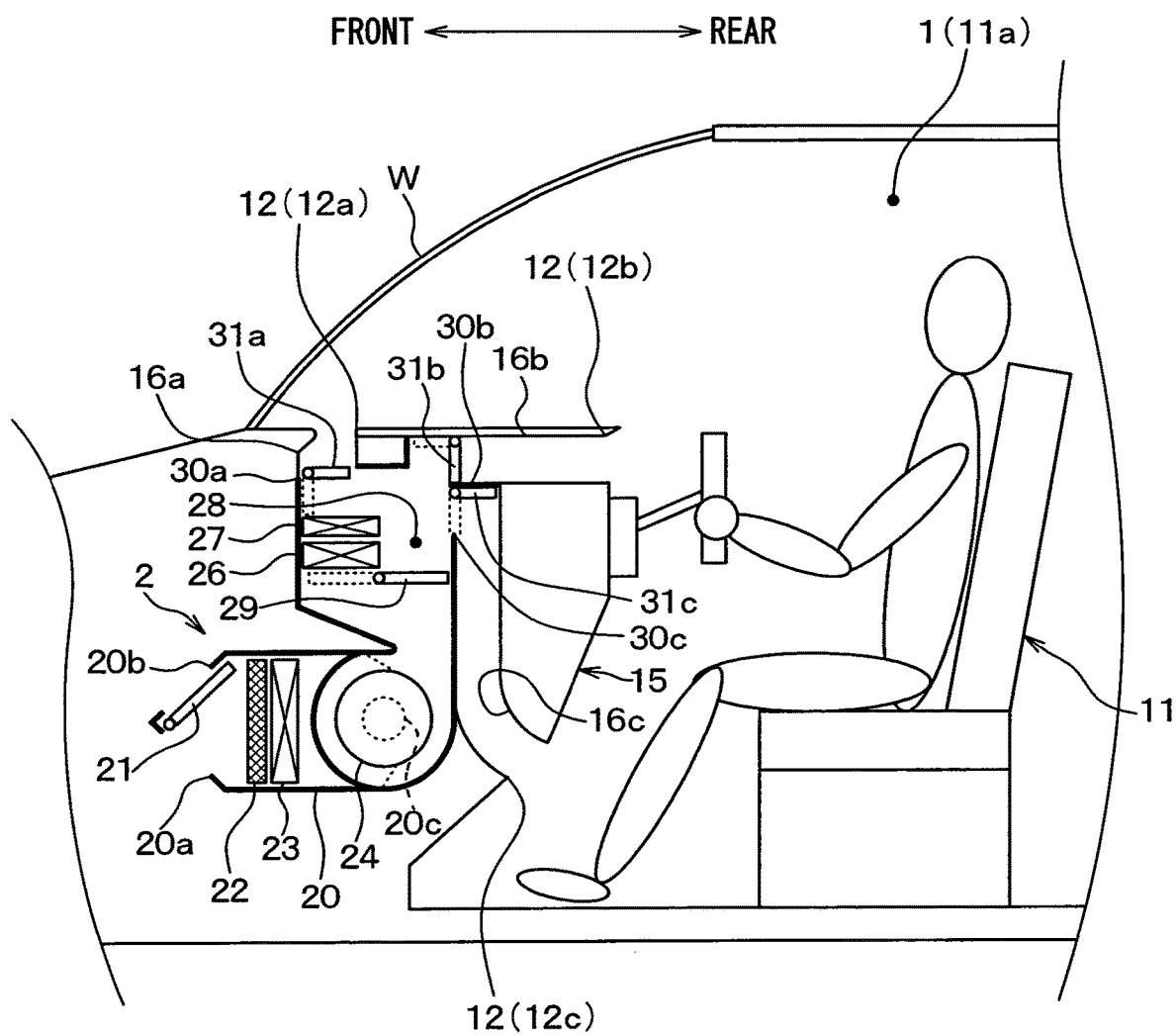
FIG. 1 is a schematic view of an air-conditioning device according to a first embodiment when a vehicle is viewed from sideways.

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration.

Figure 2:
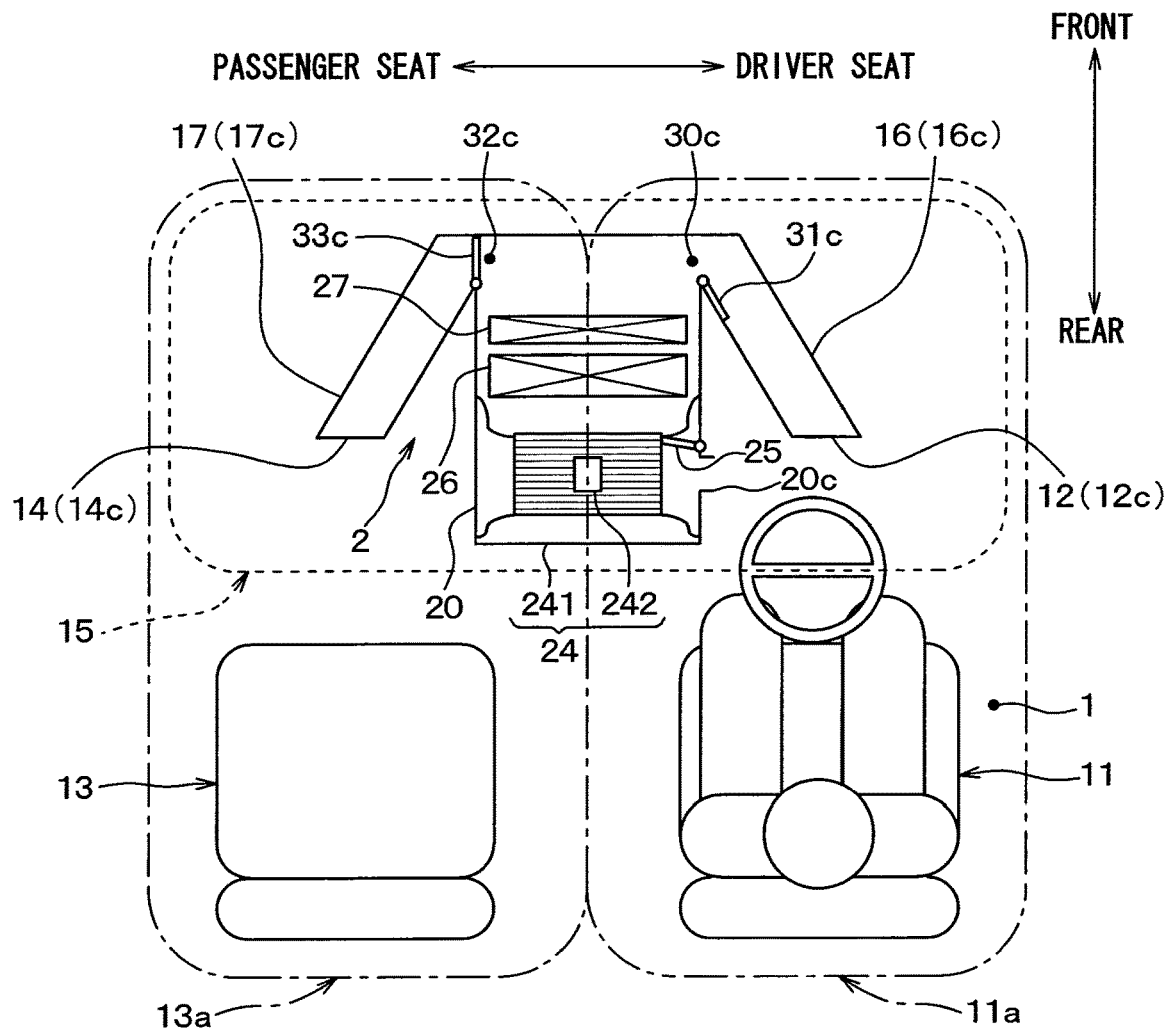
FIG. 2 is a schematic view of the air-conditioning device according to the first embodiment when the vehicle is viewed from above.

An overall configuration of an air-conditioning device 2 for a vehicle according to a first embodiment will be described using FIG. 1 and FIG. 2. In FIG. 1 and FIG. 2, respective arrows pointing frontward, rearward, to a side of a driver seat 11 (rightward), and to a side of a passenger seat 13 (leftward) indicate front, rear, right, and left directions of a vehicle, respectively.

As shown in FIG. 1 and FIG. 2, the air-conditioning device 2 of this embodiment is applied to a vehicle having a driver seat outlet 12 from which air is blown out to a space 11a on the side of the driver seat 11 in a vehicle interior 1 and a passenger seat outlet 14 from which air is blown out to a space 13a on the side of the passenger seat 13.

The driver seat outlet 12 has a driver seat defroster outlet portion 12a from which air is blown out toward a windshield W on the side of the driver seat 11 in order to prevent fogging on the windshield W. The driver seat outlet 12 also has a driver seat face outlet portion 12b from which air is blown out toward the upper half of an occupant seated on the driver seat 11 and a driver seat foot outlet portion 12c from which air is blown out toward feet of the occupant seated on the driver seat 11 in order to ensure comfort of the occupant seated on the driver seat 11. FIG. 1 shows only the space 11a on the side of the driver seat 11 in the vehicle interior 1 for ease of illustration.

Likewise, the passenger seat outlet 14 has a passenger seat defroster outlet portion (not shown) from which air is blown out toward the windshield W on the side of the passenger seat 13. The passenger seat outlet 14 also has a passenger seat face outlet portion (not shown) from which air is blown out toward the upper half of an occupant seated on the passenger seat 13 and a passenger seat foot outlet portion 14c from which air is blown out toward feet of the occupant seated on the passenger seat 13. FIG. 2 shows only the foot outlet portions 12c and 14c for ease of illustration.

The air-conditioning device 2 of this embodiment is stored inside a dashboard 15 disposed in a front part of the vehicle interior 1. A layout of the air-conditioning device 2 of this embodiment is so-called center installation, according to which the air-conditioning device 2 is disposed at a center in a vehicle right-left direction.

The air-conditioning device 2 includes a casing 20 which forms an outer shape of the air-conditioning device 2. The casing 20 of this embodiment is disposed at a position in the center in the vehicle right-left direction in such a manner that a part of the casing 20 is exposed to the space 11a on the side of the driver seat 11.

At an uppermost-stream portion in a flow of air, the casing 20 has air inlets from which air is drawn in, namely, an inside air introduction port 20a from which vehicle interior air (inside air) is introduced inside from the space 13a on the side of the passenger seat 13 and an outside air introduction port 20b from which vehicle exterior air (outside air) is introduced inside.

Further, an inside and outside air switching door 21 which opens and closes the inside air introduction port 20a and the outside air introduction port 20b is stored in the casing 20. Although it is not shown in the drawing, a servo motor as a drive portion is connected to the inside and outside air switching door 21. Hence, the inside and outside air switching door 21 is driven to open and close by the servo motor.

A filter 22 which filters out foreign matter, such as dust and dirt, is stored in the casing 20 at a position downstream of the inside air introduction port 20a and the outside air introduction port 20b in the flow of air. Further, an evaporator 23 as a cooling portion which cools air to be sent to the vehicle interior 1 is stored in the casing 20 at a position downstream of the filter 22 in the flow of air.

The evaporator 23 together with unillustrated compressor, condenser, and decompressor forms a known refrigeration cycle. The evaporator 23 is a heat exchanger which cools air flowing in the casing 20 by letting a low-pressure refrigerant flowing in the refrigeration cycle evaporate by means of heat exchange with air in the casing 20.

An air blower 24 which blows air to the vehicle interior 1 is stored in the casing 20 at a position downstream of the evaporator 23 in the flow of air. The air blower 24 of this embodiment is stored in the casing 20 at a position in the center in the vehicle right-left direction.

The air blower 24 of this embodiment includes a centrifugal impeller 241 and a blower motor 242 which rotates the impeller 241. The air blower 24 of this embodiment is an inlet-type fan configured to draw in air from the downstream side of the evaporator 23 in the flow of air.

As an air inlet other than the inside air introduction port 20$a$ and the outside air introduction port 20$b$, a driver seat inlet port 20$c$ from which air is drawn in from the space 11$a$ on the side of the driver seat 11 is provided to the casing 20 on a lateral side of the air blower 24. The driver seat inlet port 20$c$ is provided to the casing 20 in a region (near the feet of the occupant) exposed to the space 11$a$ on the side of the driver seat 11 for air to be drawn in directly from the space 11$a$ on the side of the driver seat 11.

Further, an inlet opening and closing door 25 which opens and closes the driver seat inlet port 20$c$ is stored in the casing 20. Although it is not shown in the drawing, a servo motor as a drive portion is connected to the inlet opening and closing door 25. Hence, the inlet opening and closing door 25 is driven to open and close by the servo motor.

In the casing 20, components, such as the filter 22 and the evaporator 23, which become ventilation resistance, are disposed in channels from the respective introduction port 20$a$ and 20$b$ to the air blower 24. On the contrary, such components are fewer in a channel from the driver seat inlet port 20$c$ to the air blower 24. Hence, in a case where the driver seat inlet port 20$c$ is opened by the inlet opening and closing door 25, air in the space 11$a$ on the side of the driver seat 11 is drawn into the air blower 24 via the driver seat inlet port 20$c$ even when the inside air introduction port 20$a$ or the outside air introduction port 20$b$ is open.

A heater core 26 and an electric heater 27 making up a heating portion which heats air to be sent to the vehicle interior 1 are stored in the casing 20 at a position downstream of the air blower 24 in the flow of air.

The heater core 26 is a heating heat exchanger which heats air to be sent to the vehicle interior 1 by using an engine coolant to cool an unillustrated vehicle engine as a heat source. The heater core 26 is disposed upstream of the electric heater 27 in the flow of air.

The electric heater 27 is formed of a heater (for example, a PTC heater) which generates heat when energized. The electric heater 27 is a subsidiary heating device which heats air to be sent to the vehicle interior 1 when the heater core 26 fails to heat air sufficiently.

A heating-side bypass passage 28 is provided in the casing 20 on a lateral side of the heating portion (the heater core 26 and the electric heater 27). The heating-side bypass passage 28 is a passage to let air to be sent to the vehicle interior 1 flow by bypassing the heating portion (the heater core 26 and the electric heater 27).

An air mixing door 29 is disposed in the casing 20 between the evaporator 23 and the heating portion (the heater core 26 and the electric heater 27). The air mixing door 29 is a temperature adjustment portion which adjusts a temperature of air to be blown out to the vehicle interior 1 by adjusting volumes of air flowing to the heating portion (the heater core 26 and the electric heater 27) and air flowing to the heating-side bypass passage 28. Although it is not shown in the drawing, a servo motor as a drive portion is connected to the air mixing door 29.

Multiple driver seat openings 30$a$ through 30$c$ are provided to the casing 20 at a lowermost-stream portion in the flow of air. The driver seat openings 30$a$ through 30$c$ communicate, respectively, with the outlet portions 12$a$ through 12$c$ of the driver seat outlet 12, respectively, via outlet ducts 16$a$ through 16$c$. The driver seat openings 30$a$ through 30$c$ are provided, respectively, with outlet switching doors 31$a$ through 31$c$ which open and close the openings 30$a$ through 30$c$, respectively. Although it is not shown in the drawing, servo motors as drive portions are connected to the outlet switching doors 31$a$ through 31$c$. Hence, the outlet switching doors 31$a$ through 31$c$ are driven to open and close by the corresponding servo motors.

Likewise, multiple passenger seat openings 32$c$ are provided to the casing 20 in the lowermost-stream portion in the flow of air. The passenger seat openings 32$c$ communicate with the corresponding outlet portions 14$c$ of the passenger seat outlet 14 via corresponding outlet ducts 17$c$. For ease of illustration, FIG. 2 shows only the passenger seat opening 32$c$ communicating with the passenger seat foot outlet portion 14$c$.

Each passenger seat opening 32$c$ is provided with an outlet switching door 33$c$ which opens and closes the opening 32$c$. Unillustrated servo motors as drive portions are connected to the respective outlet switching doors 33$c$. Hence, the outlet switching doors 33$c$ are driven to open and close by the corresponding servo motors.

In this embodiment, an inlet mode to draw air into the casing 20 and an outlet mode to blow out air to the vehicle interior 1 are switchable according to settings of the inside and outside air switching door 21, the inlet opening and closing door 25, the respective outlet switching doors 31$a$ through 31$c$ and 33$c$. Accordingly, in this embodiment, the inside and outside air switching door 21, the inlet opening and closing door 25, and the respective outlet switching doors 31$a$ through 31$c$ and 33$c$ together form a mode switching portion which changes the inlet mode and the outlet mode.

Figure 3:
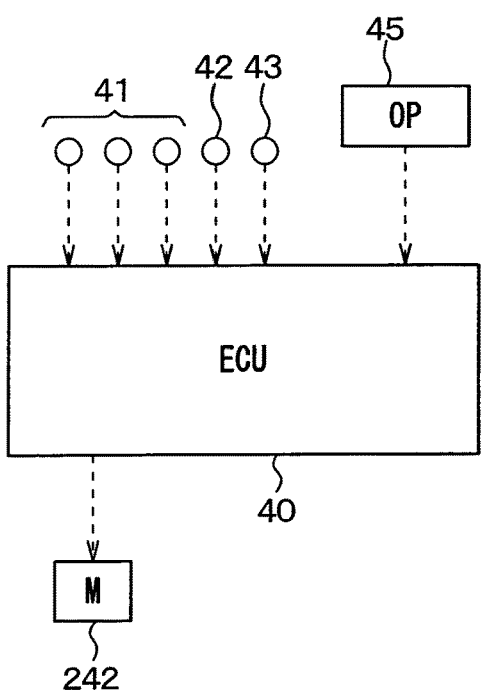
FIG. 3 is a view to describe an air-conditioning control device in the air-conditioning device according to the first embodiment.

An air-conditioning control device 40, which is an electronic control unit (ECU) of the air-conditioning device 2, will now be described using FIG. 3. The air-conditioning control device 40 is a device which includes a known microcomputer having a CPU, a memory, and so on as well as peripheral circuits, and performs various types of computation and processing according to control programs stored in the memory or the like.

A sensor group 41 for air-conditioning control of various types, including an inside air sensor to detect a vehicle interior temperature (inside air temperature), an outside air sensor to detect a vehicle exterior temperature (outside air temperature), a solar radiation sensor to detect an amount of solar radiation in the vehicle interior 1, an evaporator temperature sensor to detect a temperature of the evaporator 23, is connected to an input side of the air-conditioning control device 40.

Also, a coolant temperature sensor 42 to detect a temperature of an engine coolant, a seating sensor 43 to detect whether occupants are seated on the respective seats 11 and 13, and so on are connected to the input side of the air-conditioning control device 40.

Further, an operation panel 45 (OP) provided with various switches, such as an air-conditioning operation switch, a temperature setting switch to set the vehicle interior temperature, and a selection switch for air-conditioning modes, is connected to the input side of the air-conditioning control device 40.

On the other hand, controlled devices, including the blower motor 242 of the air blower 24, the servo motors driving the respective doors 21, 25, 29, 31*a* through 31*c*, and 33*c*, and so on, are connected to an output side of the air-conditioning control device 40.

An operation of the air-conditioning device 2 of this embodiment configured as above will now be described. When the air-conditioning operation switch of the operation panel 45 is turned ON while power is supplied, the air-conditioning control device 40 performs air-conditioning control processing according to a control program stored in the memory.

In a case where the air-conditioning mode selected by means of the selection switch is a cooling mode to lower a temperature of the vehicle interior 1 below an outside air temperature, the air-conditioning control device 40 of this embodiment performs the air-conditioning control processing as follows.

During the cooling mode, the air-conditioning control device 40 reads detection signals of the air-conditioning control sensor group 41 and an operation signal of the temperature setting switch of the operation panel 45, and calculates a target outlet temperature TAO, which is a target temperature of air to be blown out to the vehicle interior 1. The target outlet temperature TAO is calculated in accordance with Equation 1 as follows:

$$TAO = Kset \times Tset - Kr \times Tr - Kam \times Tam - Ks \times Ts + C \quad \text{(Equation 1)}$$

where Tset is a preset temperature of the vehicle interior 1 set by means of the temperature setting switch, Tr is a vehicle interior temperature detected by the inside air sensor, Tam is an outside air temperature detected by the outside air sensor, Ts is an amount of solar radiation detected by the solar radiation sensor, Kset, Kr, Kam, and Ks are control gains, and C is a correction constant.

Subsequently, operations of the respective controlled devices are determined according to the target outlet temperature TAO, a temperature of the evaporator 23 detected by the evaporator temperature sensor, and a temperature of the engine coolant detected by the coolant temperature sensor 42.

For example, the air blower 24 is set with reference to a control map pre-stored in the air-conditioning control device 40. More specifically, a control signal to be outputted to the blower motor 242 is set for the air blower 24 in such a manner that an amount of air blown by the air blower 24 is increased as the target outlet temperature TAO becomes lower.

A door opening degree of the air mixing door 29 is determined according to the target outlet temperature TAO, a temperature Te of the evaporator 23, a temperature Tw of the engine coolant, and a temperature of the electric heater 27. For example, in a case where high cooling performance is desirable because TAO is set in an extremely low temperature region, the air mixing door 29 is set at a position at which the air mixing door 29 fully opens the heating-side bypass passage 28. Conversely, in a case where high heating performance is desirable because TAO is set in an extremely high temperature region, the air mixing door 29 is set at a position at which the air mixing door 29 fully closes the heating-side bypass passage 28. A door opening degree of the air mixing door 29 during a heating mode described below is set in the same manner as above.

In the case of the inlet mode to draw air into the casing 20, either an outside air mode during which the outside air introduction port 20*b* is opened by the inside and outside air switching door 21 or an inside air mode during which the inside air introduction port 20*a* is opened by the inside and outside switching door 21 is set with reference to the control map pre-stored in the air-conditioning control device 40. More specifically, the inlet mode is fundamentally set to the outside air mode so that outside air is drawn in, and the inlet mode is set to the inside air mode in a case where high cooling performance is desirable because the target outlet temperature TAO is set in an extremely low temperature region. The inlet opening and closing door 25 is set at a position at which the inlet opening and closing door 25 closes the driver seat inlet port 20*c*.

The outlet mode to blow out air to the vehicle interior 1 is fundamentally set to a face mode during which air is blown out from the driver seat face outlet portion 12*b* and the passenger seat face outlet portion 14*b*. During the face mode, the respective openings 30*b* communicating with the face outlet portions 12*b* and 14*b* are opened whereas the other openings 30*a*, 30*c*, and 32*c* are closed by the corresponding outlet switching doors 31*a* through 31*c*, and 33*c*. In a case where fogging on the windshield W is highly likely to occur, the outlet mode may be set to a defroster mode during which air is blown out from the respective defroster outlet portions 12*a*.

In the refrigeration cycle, a rotation speed of the compressor, throttle opening of the decompressor, and so on are set with reference to the control map pre-stored in the air-conditioning control device 40 for the evaporator 23 to exert a heat absorbing action. The electric heater 27 is fundamentally de-energized.

By the air-conditioning control processing as above, during the cooling mode, air introduced inside from either the inside air introduction port 20*a* or the outside air introduction port 20*b* is cooled in the evaporator 23 and the cooled air is subsequently drawn into the air blower 24 and blown out downstream.

A part of air (cold air) blown out from the air blower 24 flows into the heating-side bypass passage 28 whereas the rest is heated while passing through the heater core 26, and both are subsequently blown out from the respective face outlet portion 12*b*, 14*b*. Each of the space 11*a* on the side of the driver seat 11 and the space 13*a* on the side of the passenger seat 13 in the vehicle interior 1 is thus cooled.

In a case where the air-conditioning mode selected by means of the selection switch is a heating mode to raise a temperature of the vehicle interior 1 above an outside air temperature, the air-conditioning control device 40 of this embodiment performs the air-conditioning control processing as follows.

During the heating mode, the air-conditioning control device 40 reads detection signals of the air-conditioning control sensor group 41 and an operation signal of the temperature setting switch of the operation panel 45, and calculates the target outlet temperature TAO, which is the target temperature of air to be blown out to the vehicle interior 1. The target outlet temperature TAO is calculated in accordance with Equation 1 above in the same manner as in the cooling mode.

Subsequently, operations of the respective controlled devices are determined according to the target outlet temperature TAO, the temperature Te of the evaporator 23 detected by the evaporator temperature sensor, the temperature Tw of the engine coolant detected by the coolant temperature sensor 42, and a detection result of the seating sensor 43.

For example, the air blower 24 is set with reference to the control map pre-stored in the air-conditioning control device 40. More specifically, a control signal to be outputted to the blower motor 242 is set for the air blower 24 in such a manner that an amount of air blown by the air blower 24 is increased as the target outlet temperature TAO becomes higher.

The electric heater 27 is energized in a case where the temperature Tw of the engine coolant is too low for the heater core 26 alone to achieve sufficient heating performance or in a case where high heating performance is desirable because the target outlet temperature TAO is set in an extremely high temperature region. An operation of the refrigeration cycle is fundamentally stopped.

Settings of the inside and outside air switching door 21, the inlet opening and closing door 25, and the respective outlet switching doors 31a through 31c and 33c making up the mode switching portion are switched according to whether occupants are seated on the driver seat 11 and the passenger seat 13.

More specifically, during a heating mode (normal heating mode) when occupants are seated on both of the driver seat 11 and the passenger seat 13, the inside and outside air switching door 21 is set at a position at which the inside and outside air switching door 21 closes the inside air introduction port 20a so that outside air is fundamentally introduced inside. The inlet opening and closing door 25 is set at a position at which the inlet opening and closing door 25 closes the driver seat inlet port 20c. It should be noted, however, that when TAO is set in an extremely high temperature region and high heating performance is desirable, the inlet opening and closing door 25 is set at a position at which the inlet opening and closing door 25 opens the inside air introduction port 20a so that inside air is introduced inside even during the normal heating mode.

Further, during the normal heating mode, the outlet mode is set to a foot mode during which air is blown out from both of the driver seat foot outlet portion 12c and the passenger seat foot outlet portion 14c. During the foot mode, the openings 30c and 32c communicating, respectively, with the foot outlet portions 12c and 14c are opened and the other openings 30a, 30b are closed by the corresponding outlet switching doors 31a through 31c and 33c.

Figure 4:
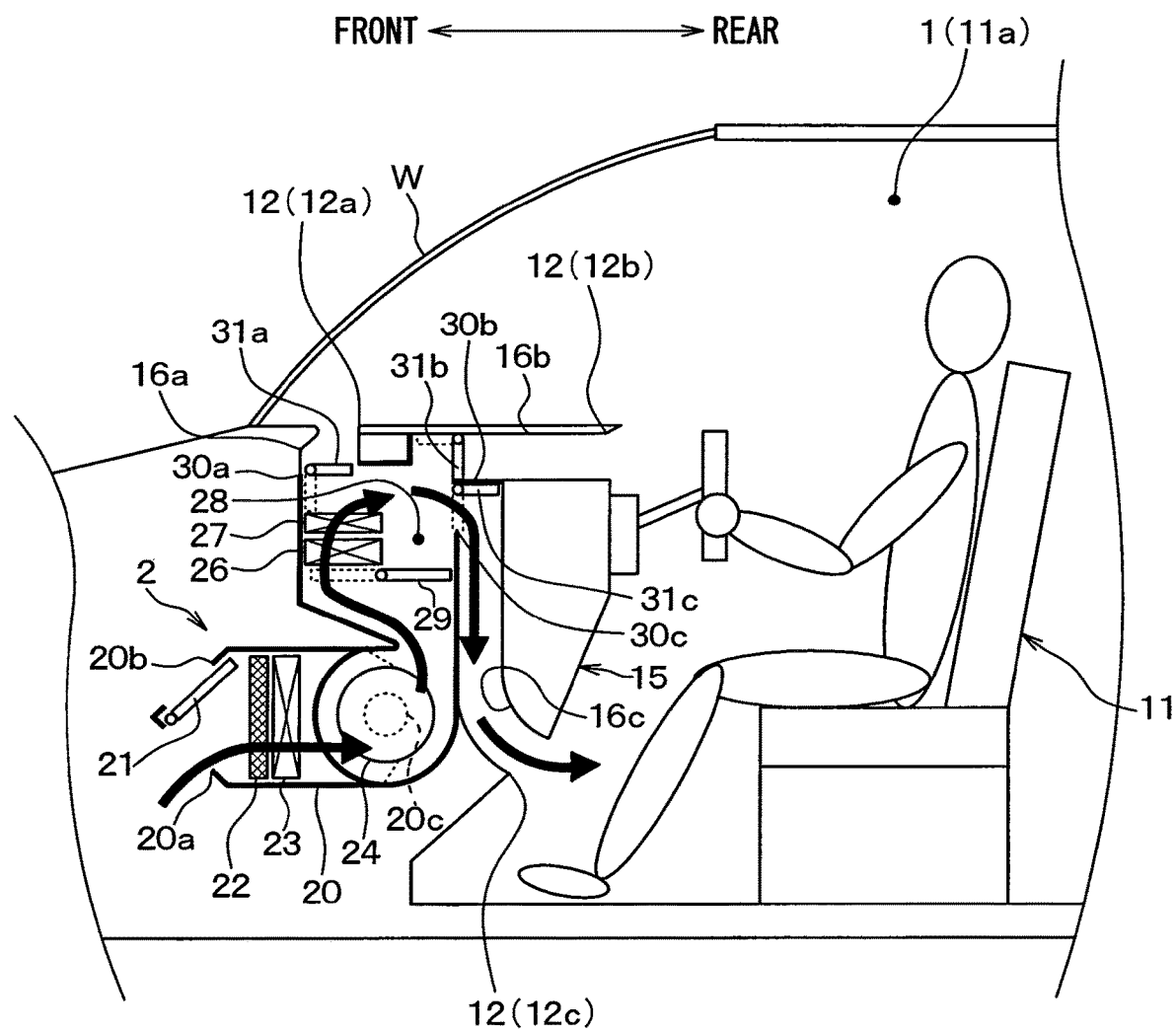
FIG. 4 is a schematic view showing a flow of air during a normal heating mode in the air-conditioning device according to the first embodiment.
Figure 5:
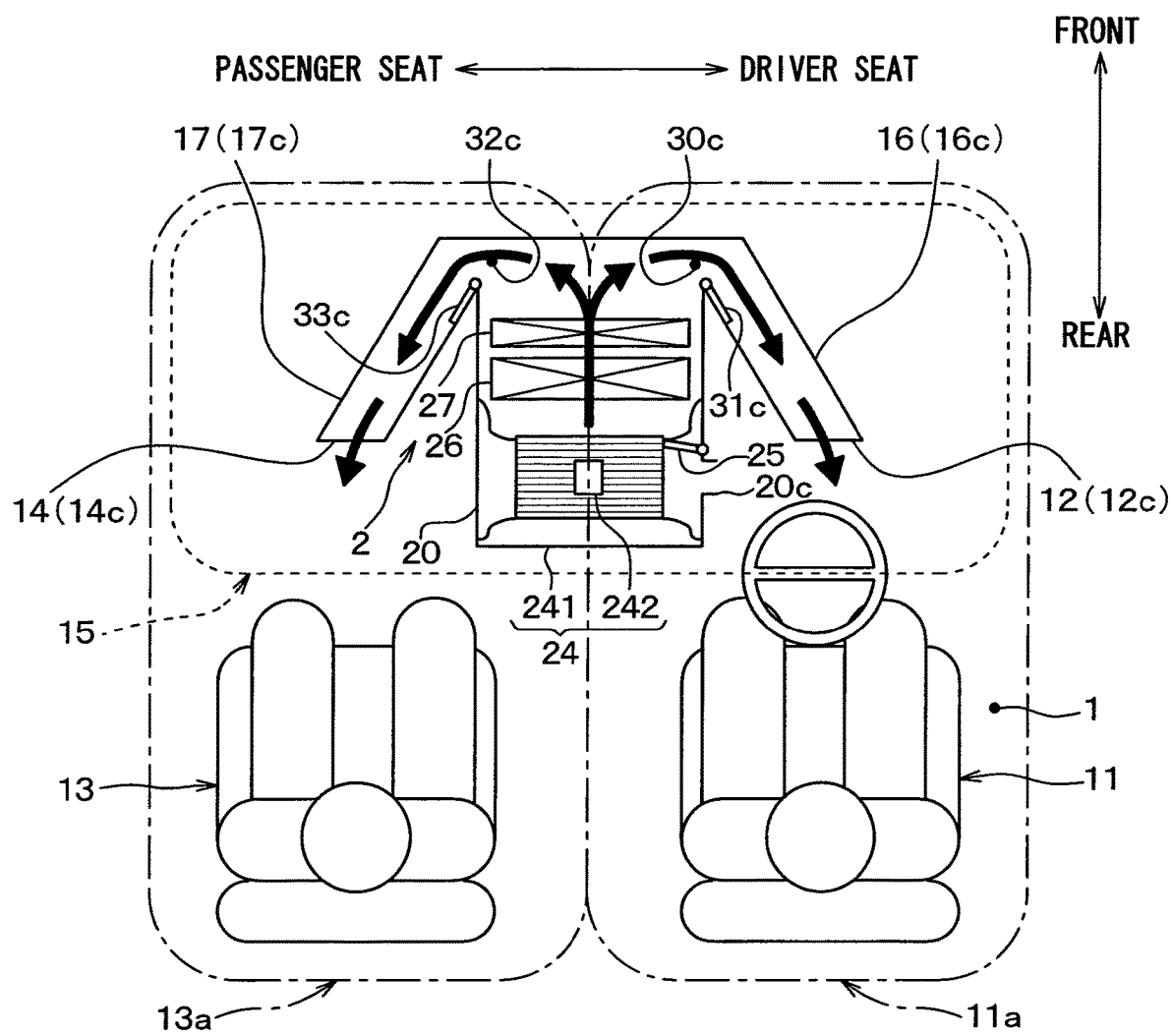
FIG. 5 is another schematic view showing a flow of air during the normal heating mode in the air-conditioning device according to the first embodiment.

By the air-conditioning control processing as above, during the normal heating mode, as indicated by thick arrows of FIG. 4 and FIG. 5, air introduced inside from either the inside air introduction port 20a or the outside air introduction port 20b passes through the evaporator 23, and introduced air is subsequently drawn into the air blower 24 and blown out downstream. A part or the whole of air blown out from the air blower 24 is heated while passing through the heater core 26 and the electric heater 27, and air which has passed through the heater core 26 and the like is blown out from the respective foot outlet portions 12c and 14c. Each of the space 11a on the side of the driver seat 11 and the space 13a on the side of the passenger seat 13 in the vehicle interior 1 is thus heated. FIG. 4 shows a case where air is drawn in from the inside air introduction port 20a for ease of illustration.

During a heating mode when an occupant is seated on the driver seat 11 alone (driver seat heating mode), the inlet opening and closing door 25 is set at a position at which the inlet opening and closing door 25 opens the driver seat inlet port 20c. Also, the inside and outside air switching door 21 is set at a position at which the inside and outside air switching door 21 closes either the inside air introduction port 20a or the outside air introduction port 20b. As has been described above, in a case where the driver seat inlet port 20c is opened, air in the space 11a on the side of the driver seat 11 is drawn into the air blower 24 via the driver seat inlet port 20c even when the inside air introduction port 20a or the outside air introduction port 20b is open.

Further, during the driver seat heating mode, the outlet mode is set to a foot mode during which air is blown out from the driver seat foot outlet portion 12c. During the foot mode, the opening 30c communicating with the driver seat foot outlet portion 12c is opened and the other openings 30a, 30b, and 32c are closed by the corresponding outlet switching doors 31a through 31c and 33c.

Figure 6:
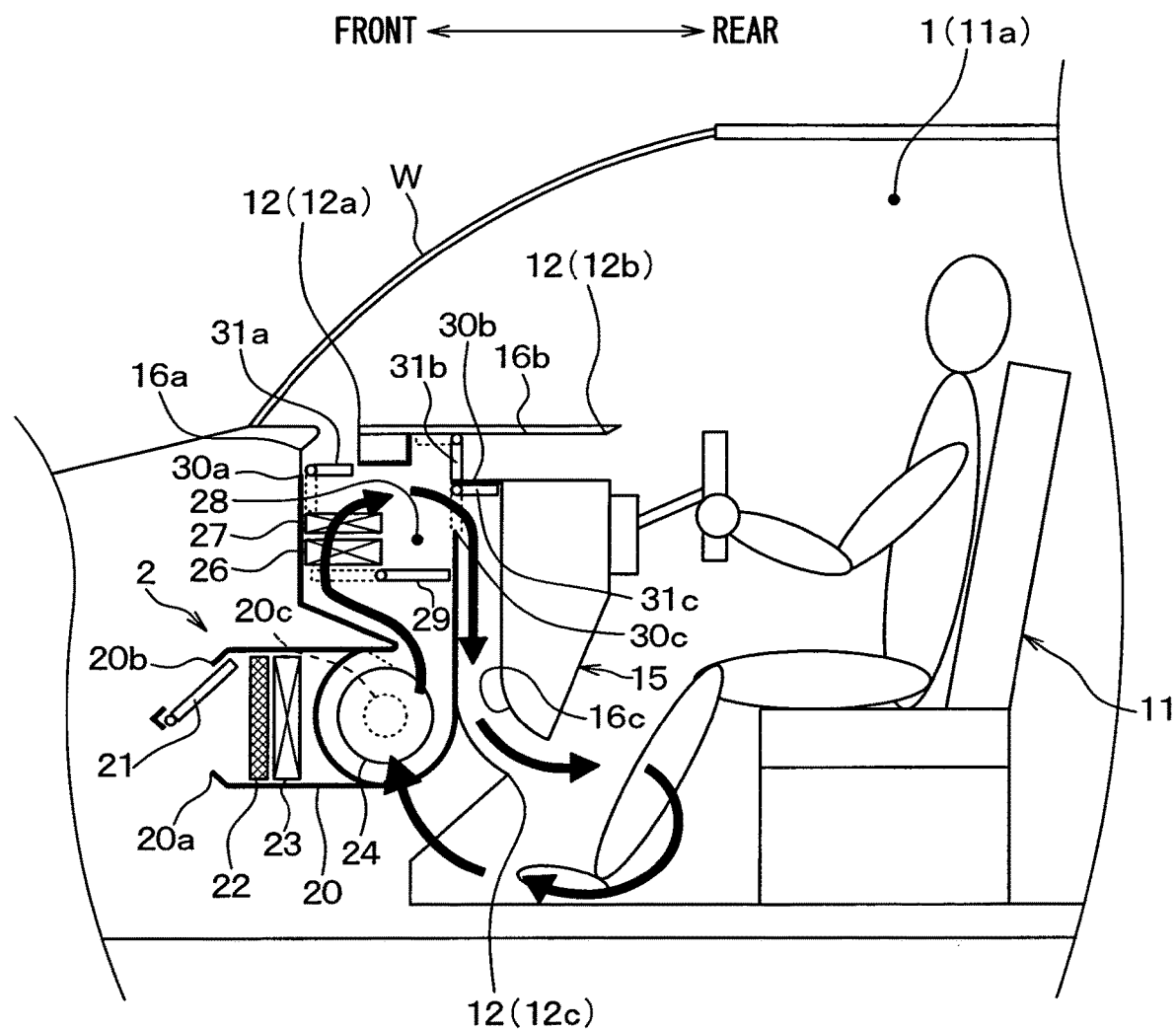
FIG. 6 is a a schematic view showing a flow of air during a driver seat heating mode in the air-conditioning device according to the first embodiment.
Figure 7:
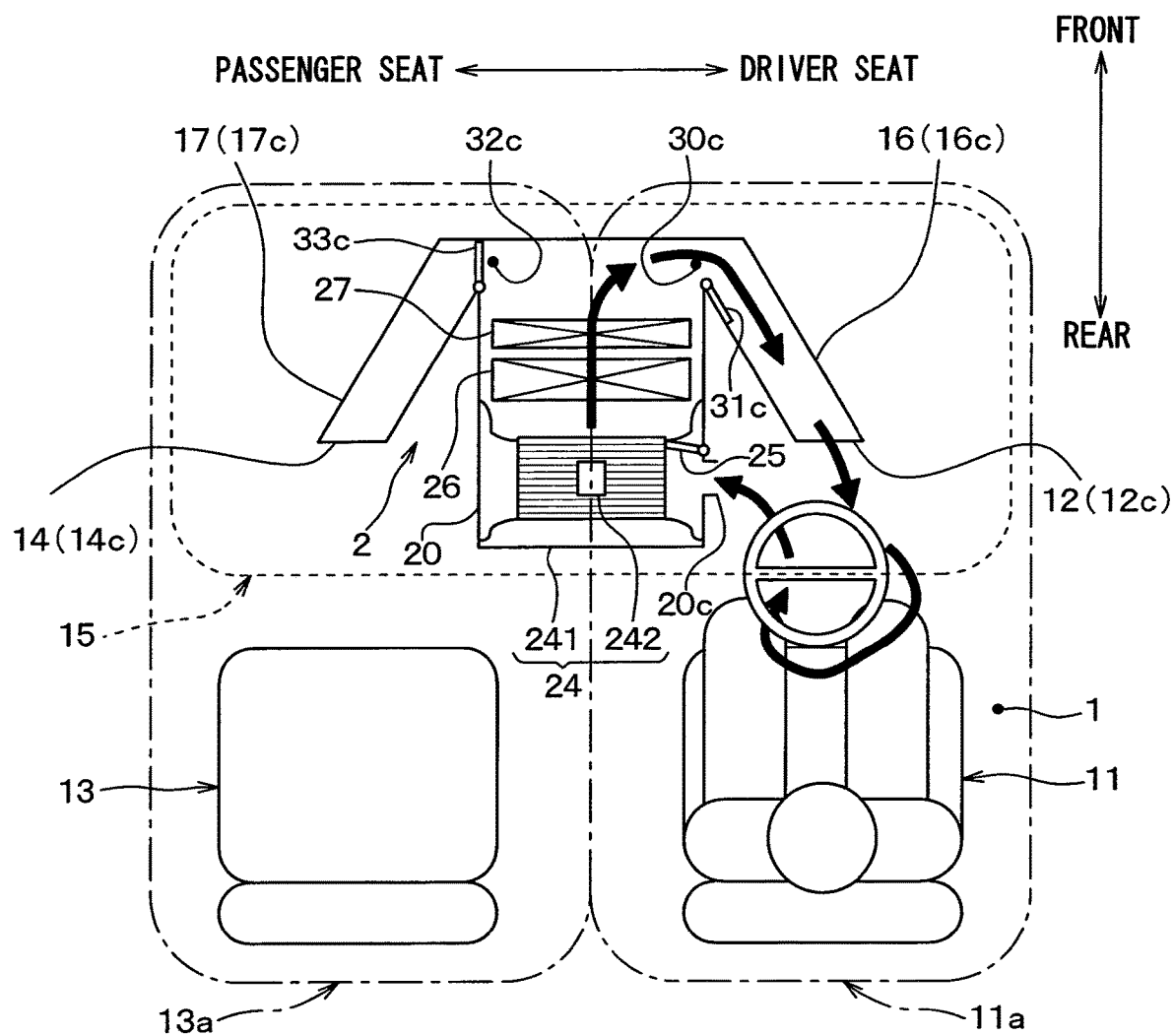
FIG. 7 is another schematic view showing a flow of air during the driver seat heating mode in the air-conditioning device according to the first embodiment.

By the air-conditioning control processing as above, during the driver seat heating mode, as indicated by thick arrows of FIG. 6 and FIG. 7, air in the space 11a on the side of the driver seat 11 is drawn into the air blower 24 via the driver seat inlet port 20c and blown out downstream. A part or the whole of air blown out from the air blower 24 is heated while passing through the heater core 26 and the electric heater 27. Air which has passed through the heater core 26 and the electric heater 27 is blown out from the driver seat foot outlet portion 12c. The space 11a on the side of driver seat 11 in the vehicle interior 1 is thus heated intensively.

According to this embodiment described above, the air-conditioning device 2 capable of reducing a heating load can be realized with a simple structure. In other words, the air-conditioning device 2 of this embodiment has a structure switchable to the driver seat heating mode during which the driver seat inlet port 20c is opened for air to be drawn in from the space 11a on the side of the driver seat 11 where air is blown out from the driver seat outlet 12.

According to the above structure, when an occupant is seated on the driver seat 11 alone, air in the space 11a on the side of the driver seat 11 and at a higher temperature than air in the space 13a on the side of the passenger seat 13 can flow into the heating portion (the heater core 26 and the electric heater 27). Hence, a heating load can be reduced.

In this embodiment, the driver seat inlet port 20c is provided to the casing 20 in a region exposed to the space 11a adjacent to the driver seat 11 for air to be drawn in directly from the space 11a of the driver seat 11. The above structure can eliminate the need to additionally provide an exclusive-use duct. Hence, the air-conditioning device 2 can be simpler.

Figure 8:
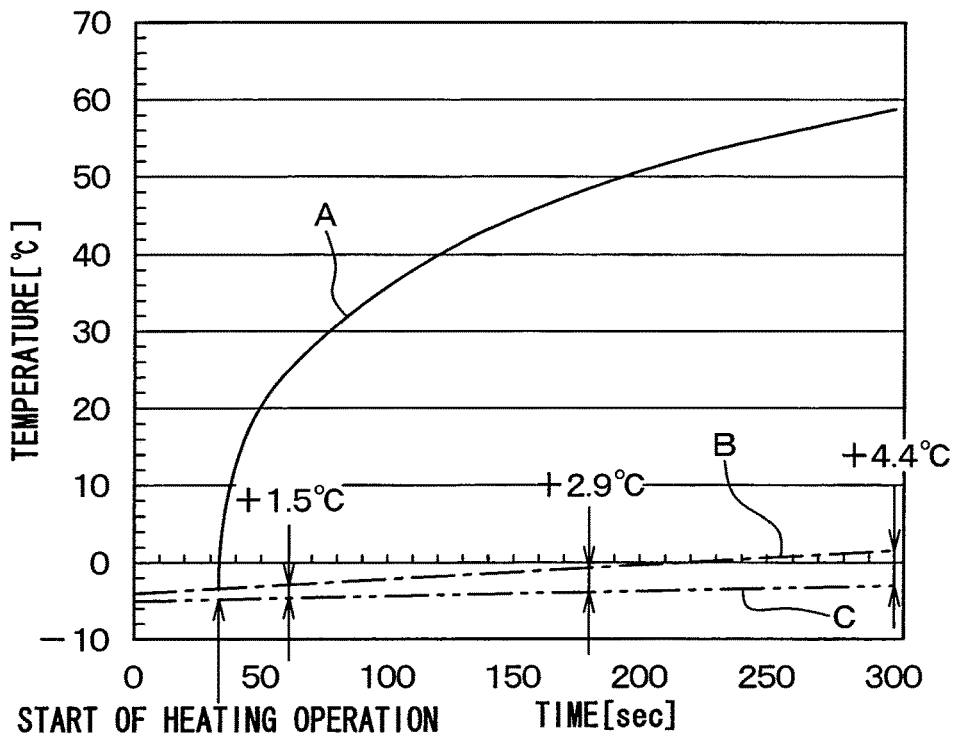
FIG. 8 is a graph showing variances in outlet temperature of air blown out from a driver seat foot outlet and atmospheric temperatures at feet of occupant during the driver seat heating mode.

FIG. 8 shows results of experiments conducted under environmental condition that the vehicle interior 1 is at an extremely low temperature (below zero) by energizing the electric heater 27 of 600 W and by blowing out the whole air (air volume: 30 m³/h) which has passed through the electric heater 27 from the driver seat foot outlet portion 12c. In FIG. 8, a solid line A represents a temperature change of air blown out from the driver seat outlet 12, an alternate long and short dash line B represents a change of an atmospheric temperature near a foot portion of the driver seat 11, and an alternate long and two short dashes line C represents a change of an atmospheric temperature near a foot portion of the passenger seat 13.

As shown in FIG. 8, the atmospheric temperature near the foot portion of the driver seat 11 rises and becomes higher than the atmospheric temperature near the foot portion of the passenger seat 13 with time. Hence, a heating load can be reduced by letting air near the foot portion of the driver seat 11 where the atmospheric temperature is higher than the atmospheric temperature near the foot portion of the passenger seat 13 flow into the heating portion (the heater core 26 and the electric heater 27). Further, in a case where air near the foot portion of the driver seat 11 where the atmospheric temperature is higher than the atmospheric temperature near the foot portion of the passenger seat 13 is let flow into the heating portion (the heater core 26 and the electric heater 27), a temperature of air to be blown out to the vehicle interior 1 rises. Hence, an instant effect of heating of the vehicle interior 1 can be enhanced.

In the air-conditioning device 2 of this embodiment, the air blower 24 is stored in the casing 20 disposed at a position in the center in the vehicle right-left direction, and the driver seat inlet port 20c is provided to the casing 20 in a region at a position in the center in the vehicle right-left direction.

By setting the position at which the air blower 24 is stored and the position at which the driver seat inlet port 20c opens in the center in the vehicle right-left direction as above, the air blower 24 becomes capable of adequately drawing in air from the space 11a of the driver seat 11 without an exclusive-use duct.

In the case of a structure by which air drawn in from the driver seat inlet port 20c passes through the cooling portion (evaporator 23) which cools air to be sent to the vehicle interior 1, heat of air drawn in from the driver seat inlet port 20c may possibly be released in the cooling portion. Releasing of heat as above may cause a temperature of air flowing into the heating portion to drop, which increases a heating load of the air-conditioning device 2. Such a structure is therefore not preferable.

On the contrary, in the air-conditioning device 2 of this embodiment, the position at which the heating portion (the heater core 26 and the electric heater 27) is stored, the position at which the air blower 24 is stored, and the position at which the driver seat inlet port 20c opens are set downstream of the evaporator 23 in the flow of air.

Accordingly, air drawn in from the driver seat inlet port 20c can be heated in the heating portion (the heater core 26 and the electric heater 27) without having to pass through the evaporator 23. Consequently, a heating load of the air-conditioning device 2 can be reduced effectively.

In this embodiment, the electric heater 27 is disposed in the air passage from the driver seat inlet port 20c to the driver seat outlet 12 in the casing 20. Accordingly, even in a case where the heater core 26 is cold when the vehicle interior 1 is heated, air to be blown to the vehicle interior 1 can be heated by energizing the electric heater 27.

The prior art has a structure by which air in the vehicle interior 1 is drawn in from the driver seat face outlet when hot air is blown out from the driver seat foot outlet. According to the structure in the prior art, hot air on the side of the driver seat 11 flows up near the head of the occupant and the occupant may possibly feel uncomfortable.

To eliminate such a possibility, in the air-conditioning device 2 of this embodiment, the driver seat inlet port 20c is provided to the casing 20 in a region (near the feet of the occupant) below the driver seat face outlet portion 12b. According to the configuration of this embodiment, hot air is circulated near the feet of the occupant seated on the driver seat 11. Hence, hot air on the side of the driver seat 11 can be restricted from flowing up near the head of the occupant. Consequently, an uncomfortable feeling the occupant may possibly have due to hot air flowing up near the head of the occupant can be restricted.

Second Embodiment

A second embodiment will now be described using FIG. 9 through FIG. 11. Portions same as or equivalent to the portions in the first embodiment above will not be described repetitively or will be described briefly in this embodiment.

Figure 9:
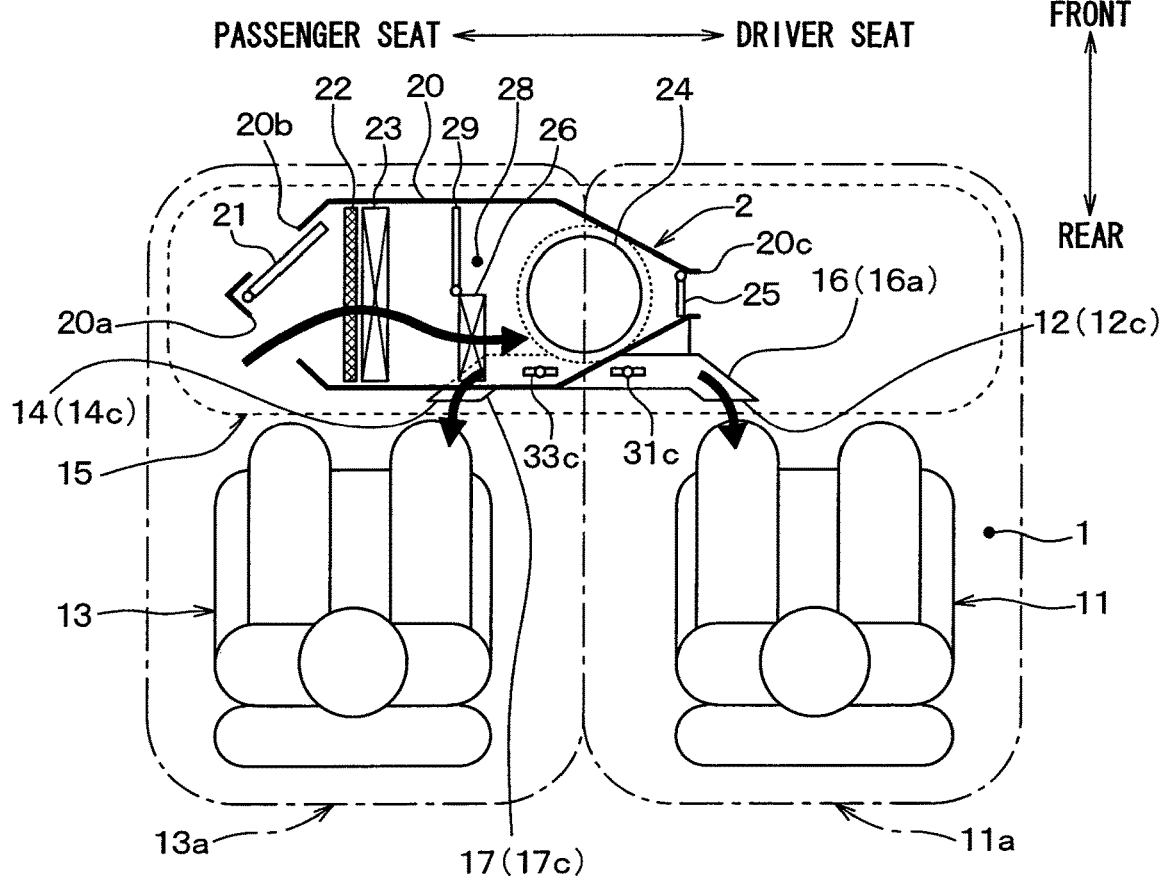
FIG. 9 is a schematic view showing a flow of air during a normal heating mode in an air-conditioning device according to a second embodiment.
Figure 10:
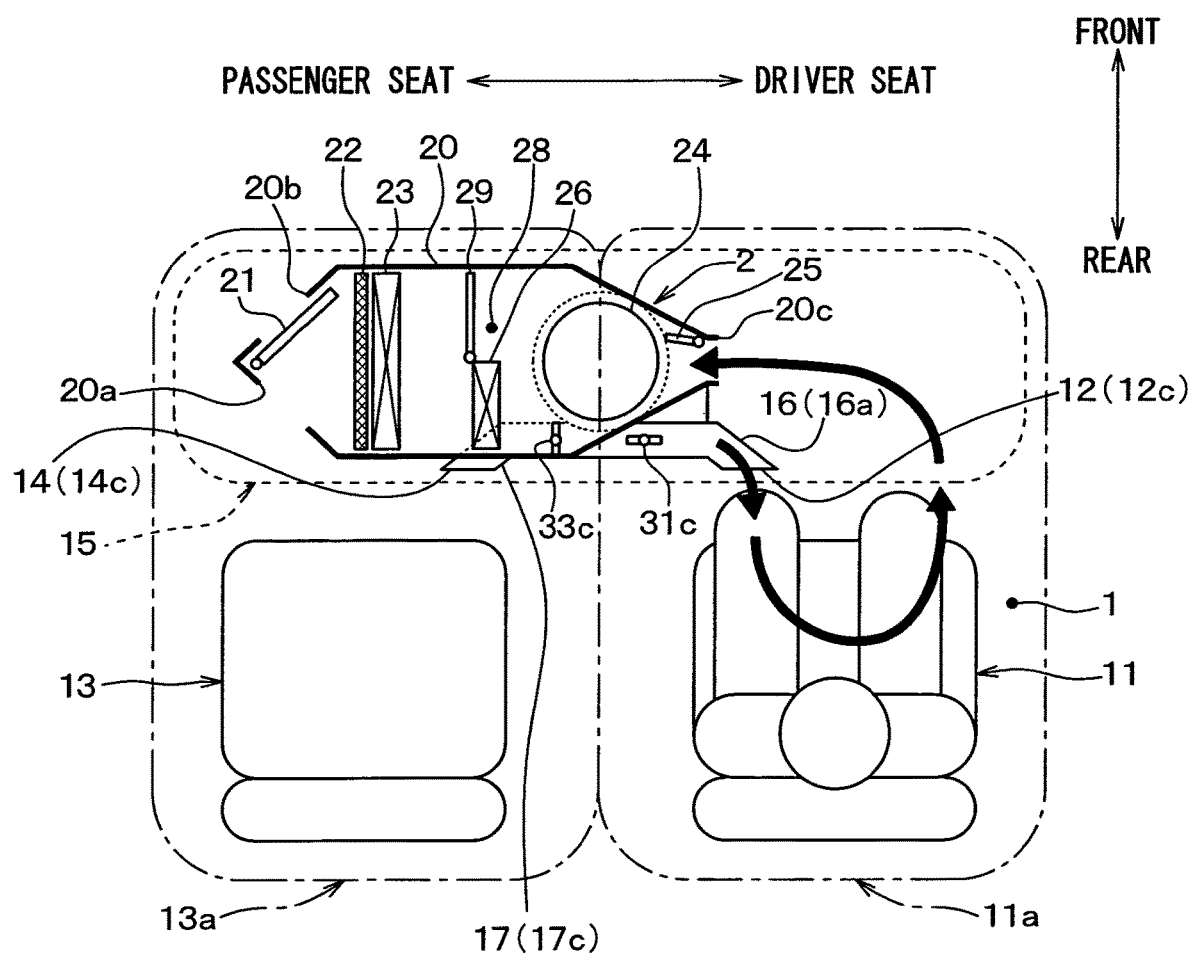
FIG. 10 is a schematic view showing a flow of air during a driver seat heating mode in the air-conditioning device according to the second embodiment.
Figure 11:
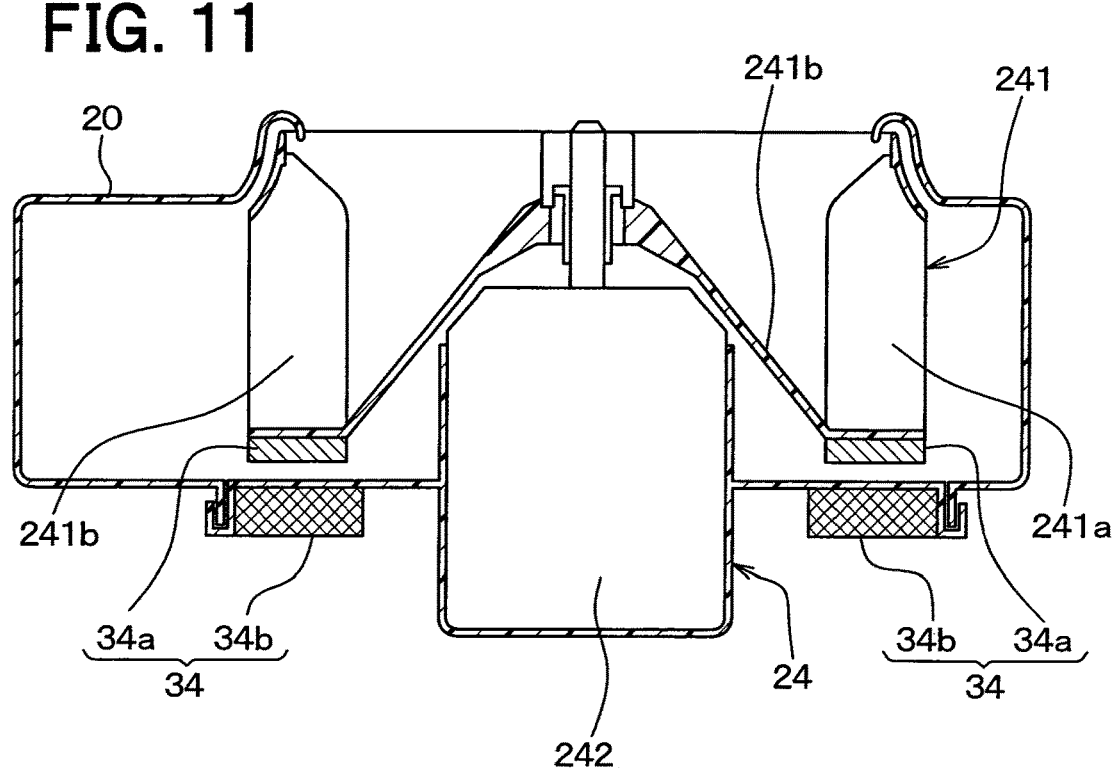
FIG. 11 is a sectional view schematically showing a configuration of an air blower according to the second embodiment.

As shown in FIG. 9 and FIG. 10, a layout of an air-conditioning device 2 of this embodiment is so-called semi-center installation, according to which the air-conditioning device 2 is disposed in a dashboard 15 to extend from a center in a vehicle right-left direction toward a passenger seat 13. A casing 20 is disposed in such a manner that an upstream side in a flow of air is on the side of the passenger seat 13 and a downstream side in the flow of air is at a position in a center in the vehicle right-left direction.

In this embodiment, a heater core 26 is disposed downstream of an evaporator 23 in the casing 20 and an air blower 24 is disposed downstream of the heater core 26. The air blower 24 of this embodiment is stored in the casing 20 at a position in the center in the vehicle right-left direction.

Further, in this embodiment, a driver seat inlet port 20c is provided to the casing 20 on a lateral side of the air blower 24 (on the side of a driver seat 11) and an inlet opening and closing door 25 which opens and closes the driver seat inlet port 20c is stored in the casing 20 on the same lateral side.

The air blower 24 of this embodiment is formed of a heater-integrated air blower equipped with a built-in electric heater 34. More specifically, as shown in FIG. 11, the air blower 24 is equipped with the built-in electric heater 34 made up of a heating element 34a made of a conductive material and an induction heating coil 34b.

The electric heater 34 of this embodiment is configured in such a manner that air drawn into the air blower 24 is heated with heat generated in the heating element 34a upon supply of a high-frequency AC current to the induction heating coil 34b and released to the indrawn air via a main plate 241b and blades 241a.

The heating element 34a is an element which generates Joule heat by resistance when a current flows. The heating element 34a of this embodiment is located outside of a ventilation path of the air blower 24 and provided to the main plate 241b which supports one end of the blade 241a of an impeller 241. When the blades 241a and the main plate 241b are made of a conductive material, the blades 241a and the main plate 241b per se may function as heating elements.

The induction heating coil 34b is a coil which generates an overcurrent at the heating element 34a by changing a magnetic field on the periphery of the heating element 34a upon supply of a high-frequency AC current. The induction heating coil 34b of this embodiment is disposed to the casing 20 in a region opposing the heating element 34a, outside of the ventilation path of the air blower 24.

An operation of the air-conditioning device 2 of this embodiment during a heating mode will now be described. In this embodiment, the electric heater 34 is energized during the heating mode.

In the air-conditioning device 2 of this embodiment, during a normal heating mode, as is indicated by thick arrows of FIG. 9, air introduced inside from either an inside air introduction port 20a or an outside air introduction port 20b passes through the evaporator 23 and is subsequently heated by flowing into the heater core 26. Air heated in the heater core 26 is drawn into the air blower 24. Indrawn air is heated in the built-in electric heater 34 of the air blower 24 and subsequently blown out from respective foot outlet portions 12c and 14c. Each of a space 11a on the side of the driver seat 11 and a space 13a on the side of the passenger seat 13 in a vehicle interior 1 is thus heated. FIG. 9 shows a case where air is drawn in from the inside air introduction port 20a for ease of illustration.

On the other hand, during a driver seat heating mode, as is indicated by thick arrows of FIG. 10, air in the space 11a on the side of the driver seat 11 is drawn into the air blower 24 via the driver seat inlet port 20c. Air drawn into the air blower 24 is heated in the built-in electric heater 34 of the air blower 24 and subsequently blown out from the driver seat foot outlet portion 12c. The space 11a on the side of the driver seat 11 in the vehicle interior 1 is thus heated intensively.

The air-conditioning device 2 of this embodiment described above has a structure switchable to the driver seat heating mode and the driver seat inlet port 20c is provided to the casing 20 in a region exposed to the space 11a on the side of the driver seat 11. Hence, as with the first embodiment above, the air-conditioning device 2 capable of reducing a heating load can be realized with a simple structure.

In this embodiment, a heater-integrated air blower equipped with the built-in electric heater 34 is adopted as the air blower 24. In comparison with the first embodiment above where the air blower 24 and the electric heater 27 are provided separately, a space to store the electric heater 34 in the casing 20 can be smaller. Ease of installation of the air-conditioning device 2 to a vehicle can be thus enhanced.

By disposing the heating element 34a and the induction heating coil 34b making up the electric heater 34 on the outside of the ventilation path of the air blower 24 as in this embodiment, power consumption of the air blower 24 and so on can be restricted by restricting an increase of ventilation resistance by the electric heater 34.

This embodiment has described a case where the air blower 24 is equipped with the built-in electric heater 34 made up of the heating element 34a and the induction heating coil 34b. The present disclosure, however, is not limited to the described case.

Figure 12:
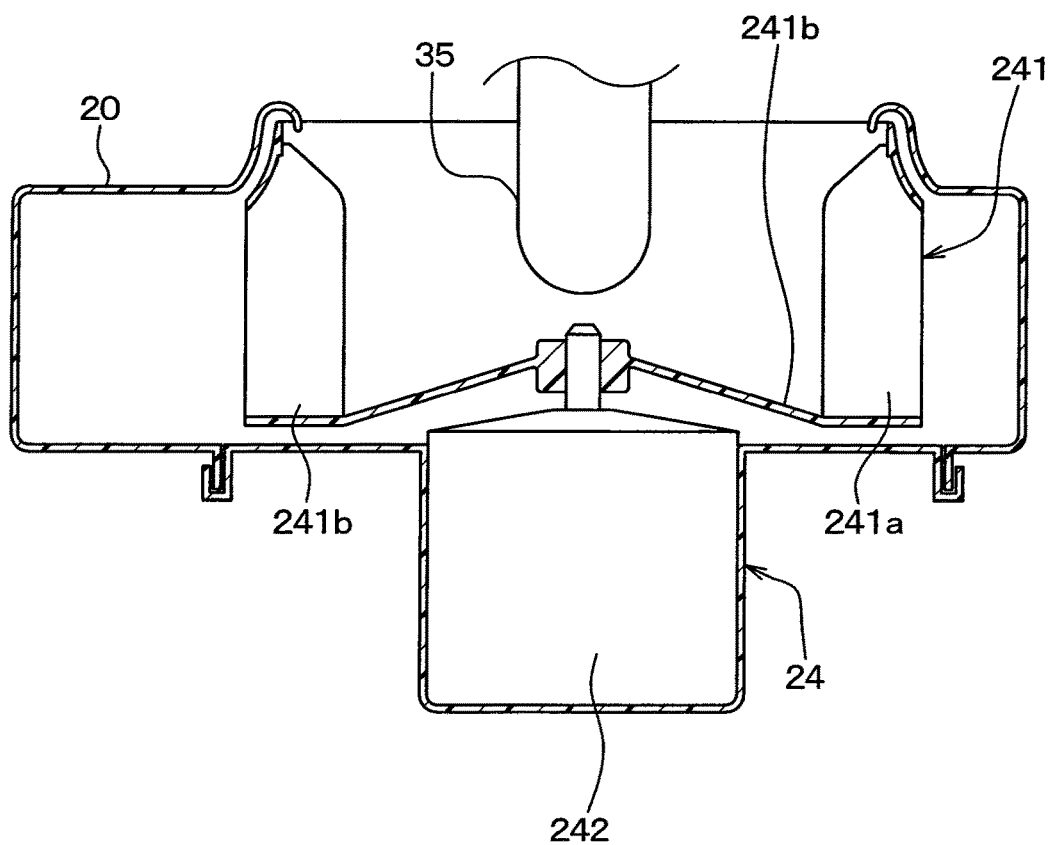
FIG. 12 is a sectional view showing a modification of the air blower according to the second embodiment.

For example, as shown in FIG. 12, the electric heater may be formed of an infrared heater 35 which heats the blades 241a by irradiating infrared rays to the blades 241a when energized. When the infrared heater 35 is used, a space to store the electric heater in the casing 20 can be smaller and power consumption of the air blower 24 and so on can be restricted by restricting an increase of ventilation resistance by the electric heater, too.

A heat-transfer coefficient for air is increased by heating air on an air inlet side of the impeller 241 than by heating air on an air outlet side due to "a front edge effect". It is therefore preferable to dispose the infrared heater 35 on the air inlet side of the impeller 241 so as to heat a front edge of the blades 241a. Also, it is preferable that the blades 241a and the main plate 241b are made of a non-metal material with high heat conductivity for a temperature to rise appropriately when irradiated by infrared rays from the infrared heater 35.

Third Embodiment

A third embodiment will now be described using FIG. 13 and FIG. 14. Portions same as or equivalent to the portions of the first and second embodiments above will not be described repetitively or will be described briefly in this embodiment.

This embodiment will describe an air-conditioning device 2 of a two-layer type using inside air and outside air, in which an air channel in a casing 20 is divided by a partition member 36 to a first air channel 36a for outside air to flow and a second air channel 36b for inside air to flow.

The air-conditioning device 2 of this embodiment has a filter 22, an evaporator 23, and a heater core 26, which are stored in the casing 20 over the respective air channels 36a and 36b.

An inside and outside air switching door 21 of this embodiment has an inside air door 21a which opens and closes an inside air introduction port 20a and an outside air door 21b which opens and closes an outside air introduction port 20b, and is therefore capable of opening and closing the introduction ports 20a and 20b individually.

In the casing 20, heating-side bypass passages 28 are provided to the respective air channels 36a and 36b and air mixing doors 29 are provided to the respective air channels 36a and 36b.

Further, first and second air blowing portions 24a and 24b making up an air blower 24 are stored, respectively, in the air channels 36a and 36b in the casing 20. Each of the first and second air blowing portions 24a and 24b is formed of a heater-integrated air blower described above.

An operation of the air-conditioning device 2 of this embodiment during a heating mode will now be described. In this embodiment, an electric heater 34 is energized during the heating mode.

Figure 13:
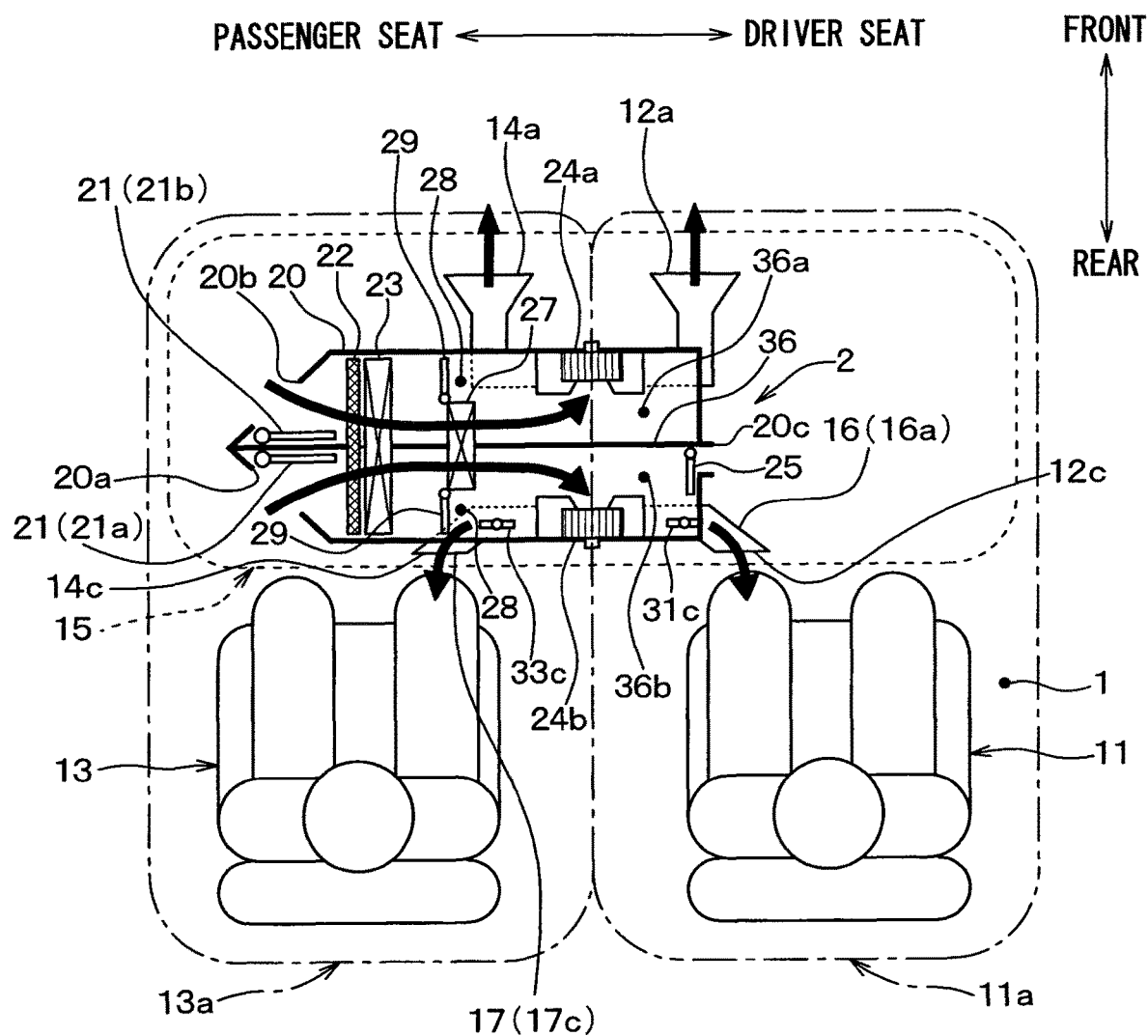
FIG. 13 is a schematic view showing a flow of air during a normal heating mode in an air-conditioning device according to a third embodiment.

In the air-conditioning device 2 of this embodiment, during a normal heating mode, as shown in FIG. 13, the inside and outside air switching door 21 is set at a position at which the inside and outside air switching door 21 opens both of the inside air introduction port 20a and the outside air introduction port 20b. An inlet opening and closing door 25 is set at a position at which the inlet opening and closing door 25 closes a driver seat inlet port 20c. Further, during the normal heating mode, an outlet mode is set to a foot defroster mode during which air is blown out from respective defroster outlet portions 12a and 14a and respective foot outlet portions 12c and 14c.

By the air-conditioning control processing as above, during the normal heating mode, as is indicated by thick arrows of FIG. 13, outside air introduced inside from the outside air introduction port 20b passes through the evaporator 23 and is subsequently heated by flowing into the heater core 26. Air heated in the heater core 26 is drawn into the first air blowing portion 24a and heated in a built-in electric heater (not shown) of the first air blowing portion 24a. Heated air is subsequently blown out from the respective defroster outlet portions 12a and 14a. Fogging on a windshield W can be thus restricted.

Also, during the normal heating mode, air introduced inside from the inside air introduction port 20a passes through the evaporator 23 and is subsequently heated by flowing into the heater core 26. Air heated in the heater core 26 is drawn into the second air blowing portion 24b and heated in a built-in electric heater (not shown) of the second air blowing portion 24b. Heated air is subsequently blown out from the respective foot outlet portions 12c and 14c. Each of a space 11a on the side of a driver seat 11 and a space 13a on the side of a passenger seat 13 in a vehicle interior 1 is thus heated.

Figure 14:
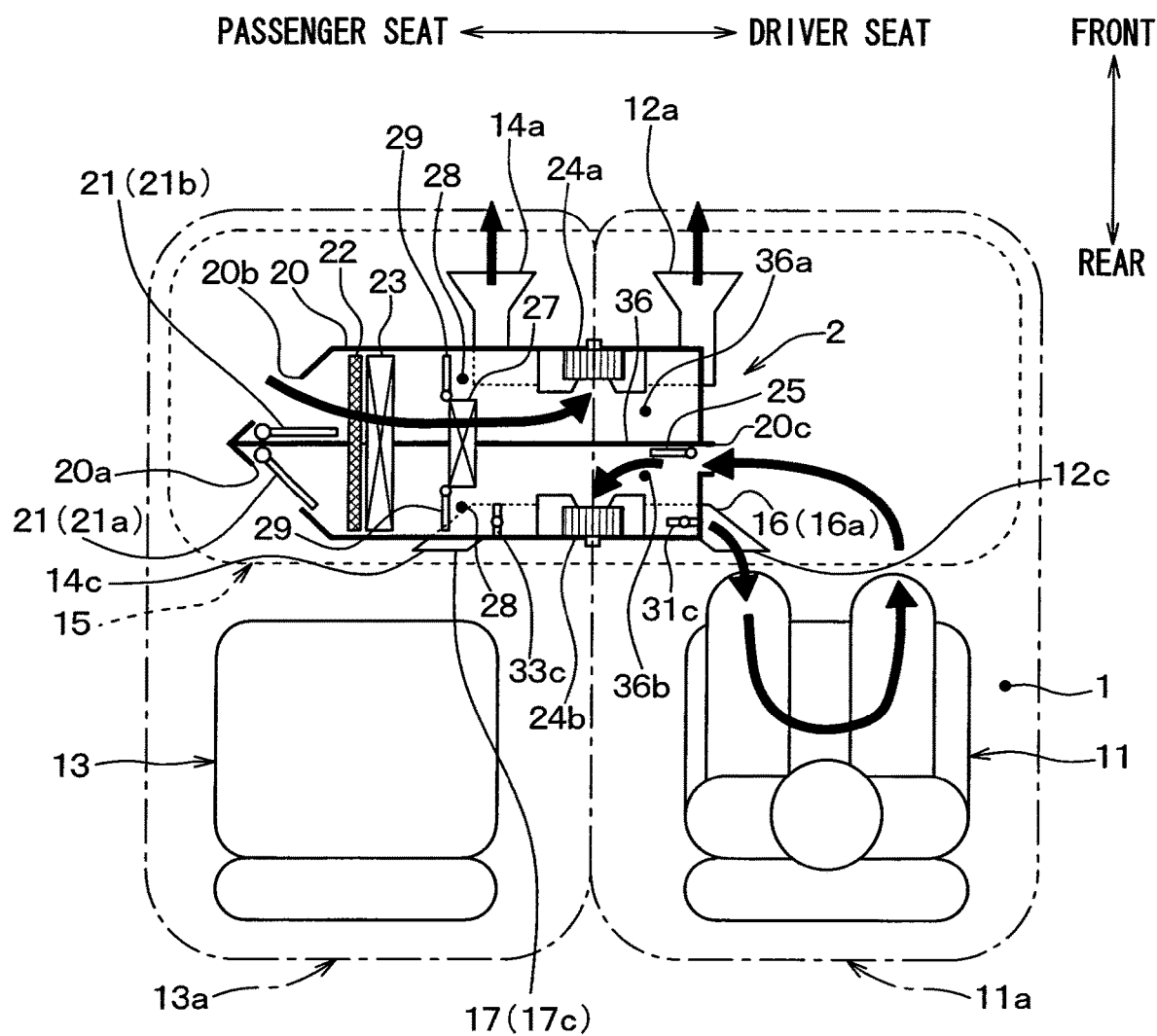
FIG. 14 is a schematic view showing a flow of air during a driver seat heating mode in the air-conditioning device according to the third embodiment.

On the other hand, during a driver seat heating mode, as is shown in FIG. 14, the inside and outside air switching door 21 is set at a position at which the inside and outside air switching door 21 closes the inside air introduction port 20a and opens the outside air introduction port 20b. The inlet opening and closing door 25 is set at a position at which the inlet opening and closing door 25 opens the driver seat inlet port 20c. Further, during the driver seat heating mode, the outlet mode is set to a foot defroster mode during which air is blown out from the respective defroster outlet portions 12a and 14a and the driver seat foot outlet portion 12c.

By the air-conditioning control processing as above, during the driver seat heating mode, as is indicated by thick arrows of FIG. 14, outside air introduced inside from the outside air introduction port 20b passes through the evaporator 23 and is subsequently heated by flowing into the heater core 26. Air heated in the heater core 26 is drawn into the first air blowing portion 24a and heated in the built-in electric heater (not shown) of the first air blowing portion 24a. Heated air is subsequently blown out from the respective defroster outlet portions 12a and 14a. Fogging on the windshield W can be thus restricted.

Also, during the driver seat heating mode, air in the space 11a on the side of the driver seat 11 is drawn into the second air blowing portion 24b via the driver seat inlet port 20c. Air drawn into the second air blowing portion 24b is heated in the built-in electric heater (not shown) of the second air blowing portion 24b and subsequently blown out from the driver seat foot outlet portion 12c. The space 11a on the side of the driver seat 11 in the vehicle interior 1 is thus heated intensively.

The air-conditioning device 2 of this embodiment described above has a structure switchable to the driver seat heating mode and the driver seat inlet port 20c is provided to the casing 20 in a region exposed to the space 11a on the side of the driver seat 11. Hence, as with the first embodiment above, the air-conditioning device 2 capable of reducing a heating load can be realized with a simple structure.

In this embodiment, air is blown out from the driver seat foot outlet portion 12c and dry outside air is blown out toward the windshield W from the respective defroster outlet portions 12a and 14a during the driver seat heating mode. Hence, fogging on the windshield in the vehicle interior 1 can be restricted while heating the vehicle interior 1.

Fourth Embodiment

A fourth embodiment will now be described using FIG. 15 through FIG. 17. Portions same as or equivalent to the portions of the first through third embodiments above will not be described repetitively or will be described briefly in this embodiment.

Figure 15:
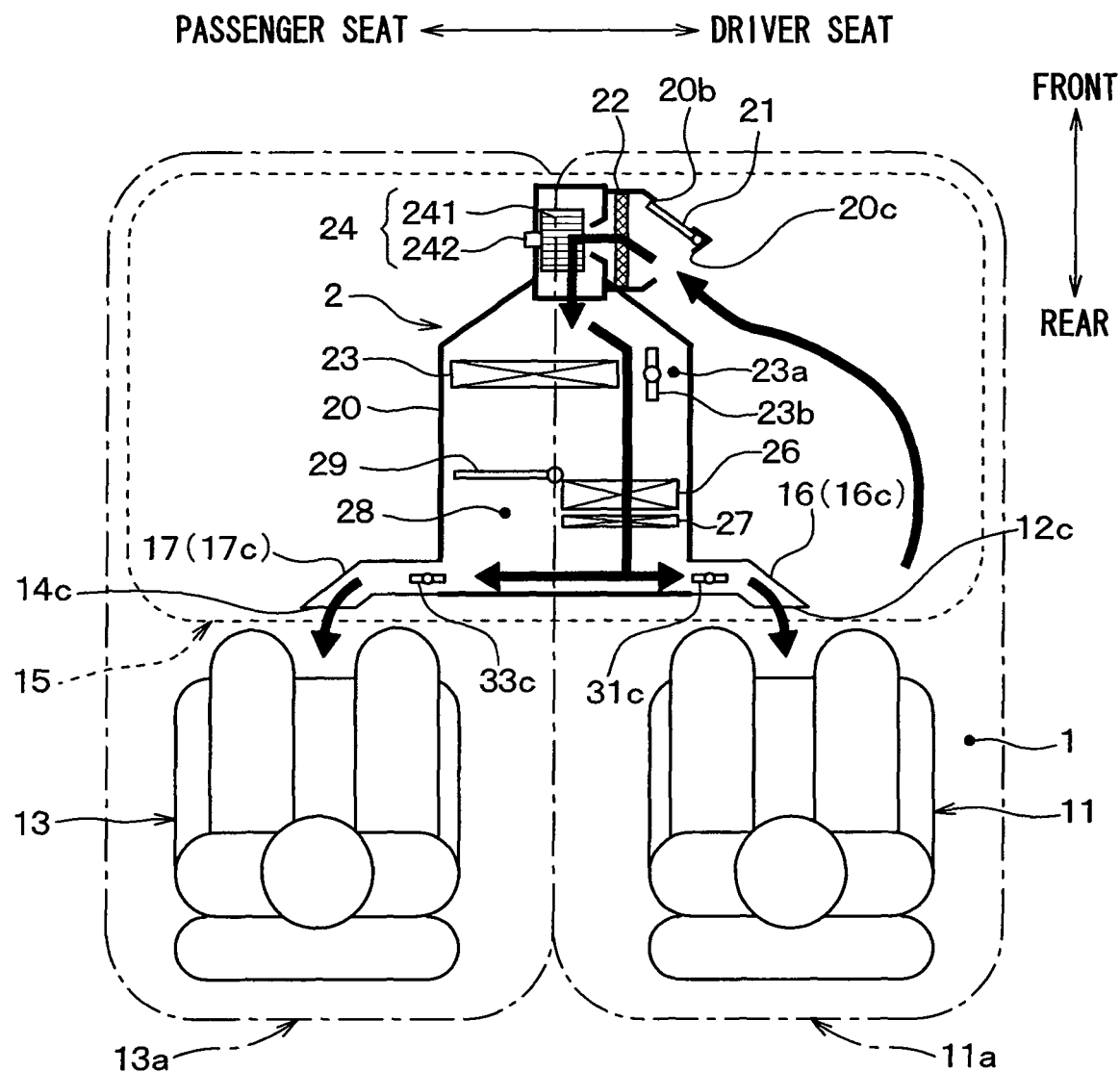
FIG. 15 is a schematic view showing a flow of air during a normal heating mode in an air-conditioning device according to a fourth embodiment.
Figure 16:
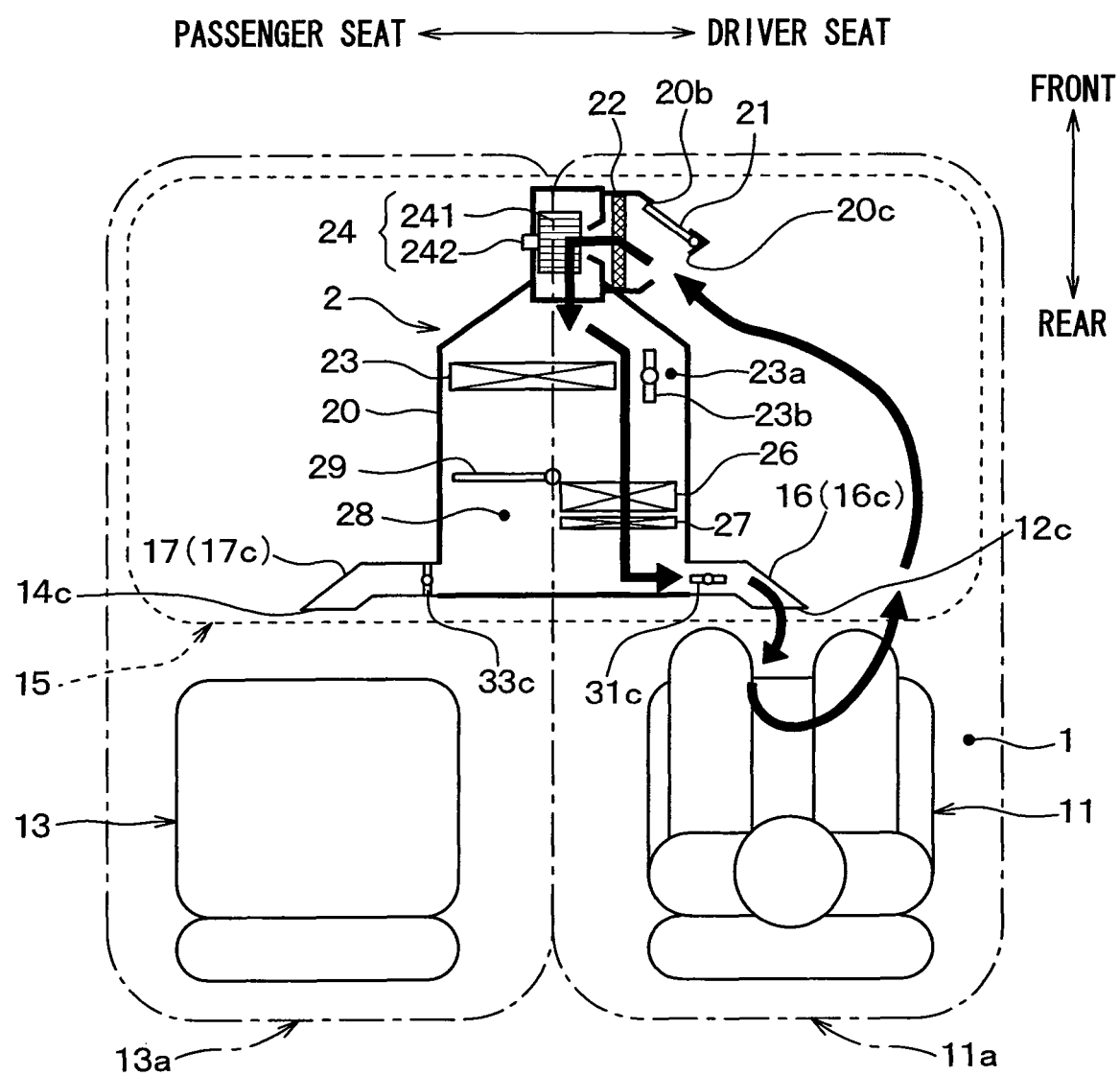
FIG. 16 is a schematic view showing a flow of air during a driver seat heating mode in the air-conditioning device according to the fourth embodiment.
Figure 17:
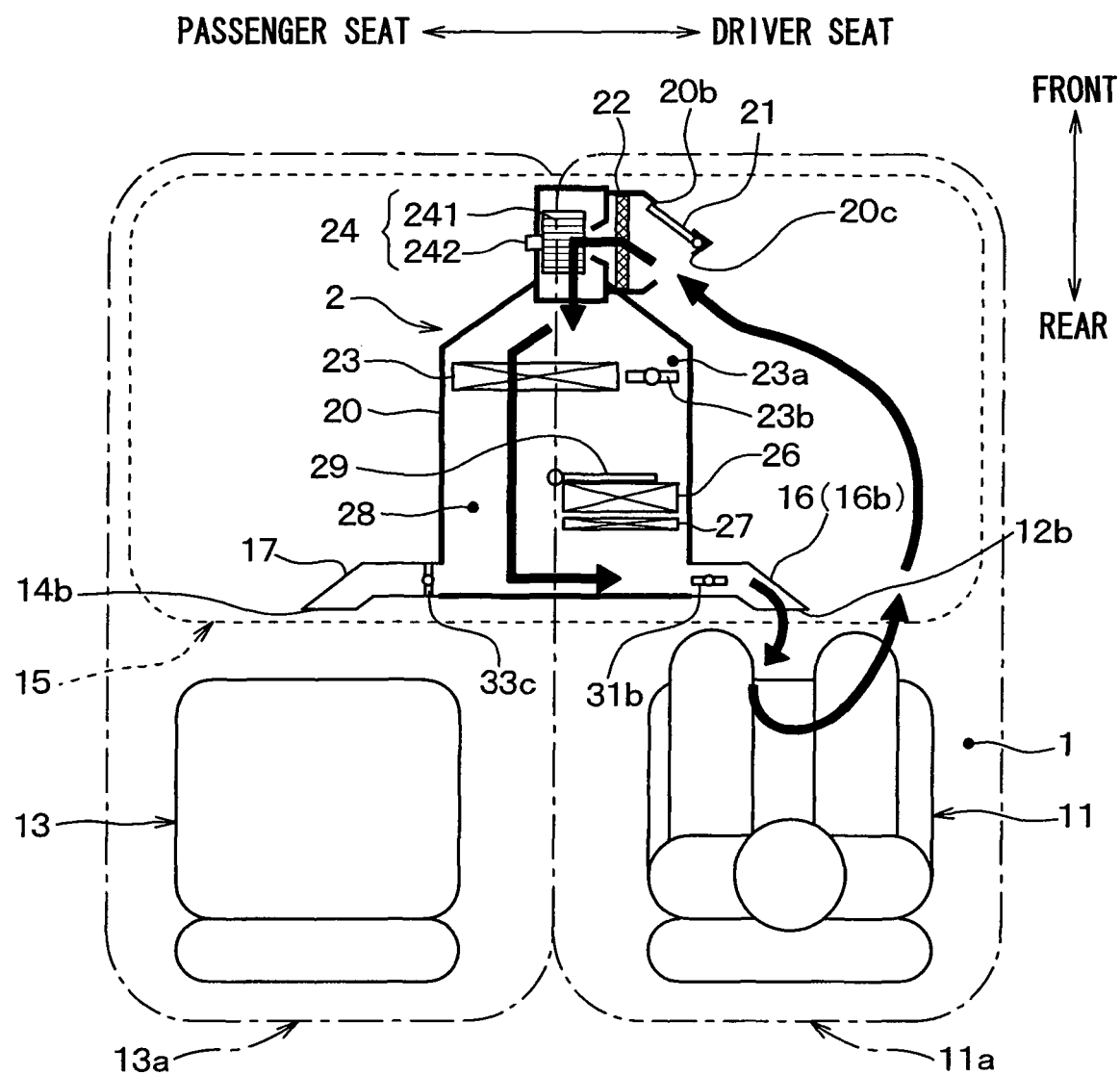
FIG. 17 is a schematic view showing a flow of air during a driver seat cooling mode in the air-conditioning device according to the fourth embodiment.

In an air-conditioning device 2 of this embodiment, as shown in FIG. 15 through FIG. 17, an inside air introduction port 20a is omitted and an outside air introduction port 20b and a driver seat inlet port 20c are provided to a casing 20 in an uppermost-stream portion in a flow of air. An inside and outside air switching door 21 is provided in the casing 20 so as to be capable of selectively opening and closing the outside air introduction port 20b and the driver seat inlet port 20c. The driver seat inlet port 20c of this embodiment is provided to the casing 20 in a region exposed to the space 11a adjacent to the driver seat 11.

In this embodiment, an air blower 24 is disposed upstream of an evaporator 23 in the casing 20. The air blower 24 of this embodiment is a positive fan which draws in air from upstream of the evaporator 23 in the flow of air.

The casing 20 of this embodiment is provided with a cooling-side bypass passage 23a on a lateral side of the evaporator 23 to let air flow by bypassing the evaporator 23. A cooling opening and closing door 23b which opens and closes the cooling-side bypass passage 23a is disposed in the cooling-side bypass passage 23a.

An element which becomes ventilation resistance is absent in the cooling-side bypass passage 23a. Hence, when the cooling-side bypass passage 23a is opened by the cooling opening and closing door 23b, air blown by the air blower 24 bypasses the evaporator 23 and flows the cooling-side bypass passage 23a.

An operation of the air-conditioning device 2 of this embodiment during a heating mode will now be described. During a normal heating mode, as shown in FIG. 15, the inside and outside air switching door 21 is set at a position at which the inside and outside air switching door 21 opens the driver seat inlet port 20c and an outlet mode is set to a foot mode during which air is blown out from respective foot outlet portions 12c and 14c. The cooling opening and closing door 23b is set at a position at which the cooling opening and closing door 23b opens the cooling-side bypass passage 23a.

Also, during the normal heating mode, as is indicated by thick arrows of FIG. 15, air in the space 11a on the side of the driver seat 11 is drawn into the air blower 24 from the driver seat inlet port 20c and blown out downstream. Air blown out from the air blower 24 is heated by flowing into a heater core 26 and an electric heater 27 via the cooling-side bypass passage 23a. Air heated in the heater core 26 and the electric heater 27 is blown out from the respective foot outlet portions 12c and 14c. Each of the space 11a on the side of the driver seat 11 and a space 13a on the side of a passenger seat 13 in a vehicle interior 1 is thus heated.

On the other hand, during a driver seat heating mode, as shown in FIG. 16, the inside and outside air switching door 21 is set at a position at which the inside and the outside air switching door 21 opens the driver seat inlet port 20c and the outlet mode is set to a foot defroster mode during which air is blown out from the driver seat foot outlet portion 12c. The cooling opening and closing door 23b is set at a position at which the cooling opening and closing door 23b opens the cooling-side bypass passage 23a.

Also, during the driver seat heating mode, as is indicated by thick arrows of FIG. 16, air in the space 11a on the side of the driver seat 11 is drawn into the blower 24 from the driver seat inlet port 20c and blown out downstream. Air blown out from the air blower 24 is heated by flowing into the heater core 26 and the electric heater 27 via the cooling-side bypass passage 23a. Air heated in the heater core 26 and the electric heater 27 is blown out from the driver seat foot outlet portion 12c. The space 11a on the side of the driver seat 11 in the vehicle interior 1 is thus heated intensively.

An operation of the air-conditioning device 2 of this embodiment during a cooling mode will now be described. During a cooling mode (driver seat cooling mode) when an occupant is seated on the driver seat 11 alone, as shown in FIG. 17, the inside and outside air switching door 21 is set at a position at which the inside and outside air switching door 21 opens the driver seat inlet port 20c and the outlet mode is set to a face mode during which air is blown out from a driver seat face outlet portion 12b. The cooling opening and closing door 23b is set at a position at which the cooling opening and closing door 23b closes the cooling-side bypass passage 23a and an air mixing door 29 is set at a position at which the air mixing door 29 fully opens a heating-side bypass passage 28.

Also, during the driver seat cooling mode, as is indicated by thick arrows of FIG. 17, air in the space 11a on the side of the driver seat 11 is drawn into the air blower 24 from the driver seat inlet port 20c and blown out downstream. Air blown out from the air blower 24 is cooled by flowing into the evaporator 23. Air cooled in the evaporator 23 is blown out from the driver seat face outlet portion 12b. The space 11a on the side of the driver seat 11 in the vehicle interior 1 is thus cooled intensively.

On the other hand, during a cooling mode (normal cooling mode) when occupants are seated on both of the driver seat 11 and the passenger seat 13, the inside and outside air switching door 21 is set at a position at which the inside and outside air switching door 21 opens the driver seat inlet port 20c. The outlet mode is set to a face mode during which air is blown out from the driver seat face outlet portion 12b and a passenger seat face outlet portion 14b. The cooling opening and closing door 23b is set at a position at which the cooling opening and closing door 23b closes the cooling-side bypass passage 23a and the air mixing door 29 is set at a position at which the air mixing door 29 fully opens the heating-side bypass passage 28.

Also, during the normal cooling mode, air in the space 11a on the side of the driver seat 11 is drawn into the air blower 24 from the driver seat inlet port 20c and blown out downstream. Air blown out from the air blower 24 is cooled by flowing into the evaporator 23. Air cooled in the evaporator 23 is blown out from the driver seat face outlet portion 12b and the passenger seat face outlet portion 14b. Both of the space 11a on the side of the driver seat 11 and the space 13a on the side of the passenger seat 13 in the vehicle interior 1 are thus cooled.

The air-conditioning device 2 of this embodiment described above has a structure switchable to the driver seat heating mode and the driver seat inlet port 20c is provided to the casing 20 in a region exposed to the space 11a on the side of the driver seat 11. Hence, as with the first embodiment above, the air-conditioning device 2 capable of reducing a heating load can be realized with a simple structure.

The air-conditioning device 2 of this embodiment also has a structure switchable to the driver seat cooling mode. Hence, the air-conditioning device 2 is also capable of reducing a cooling load.

Fifth Embodiment

A fifth embodiment will now be described using FIG. 18. Components same as or equivalent to the components of the first through fourth embodiments above will not be described repetitively or will be described briefly in this embodiment.

Figure 18:
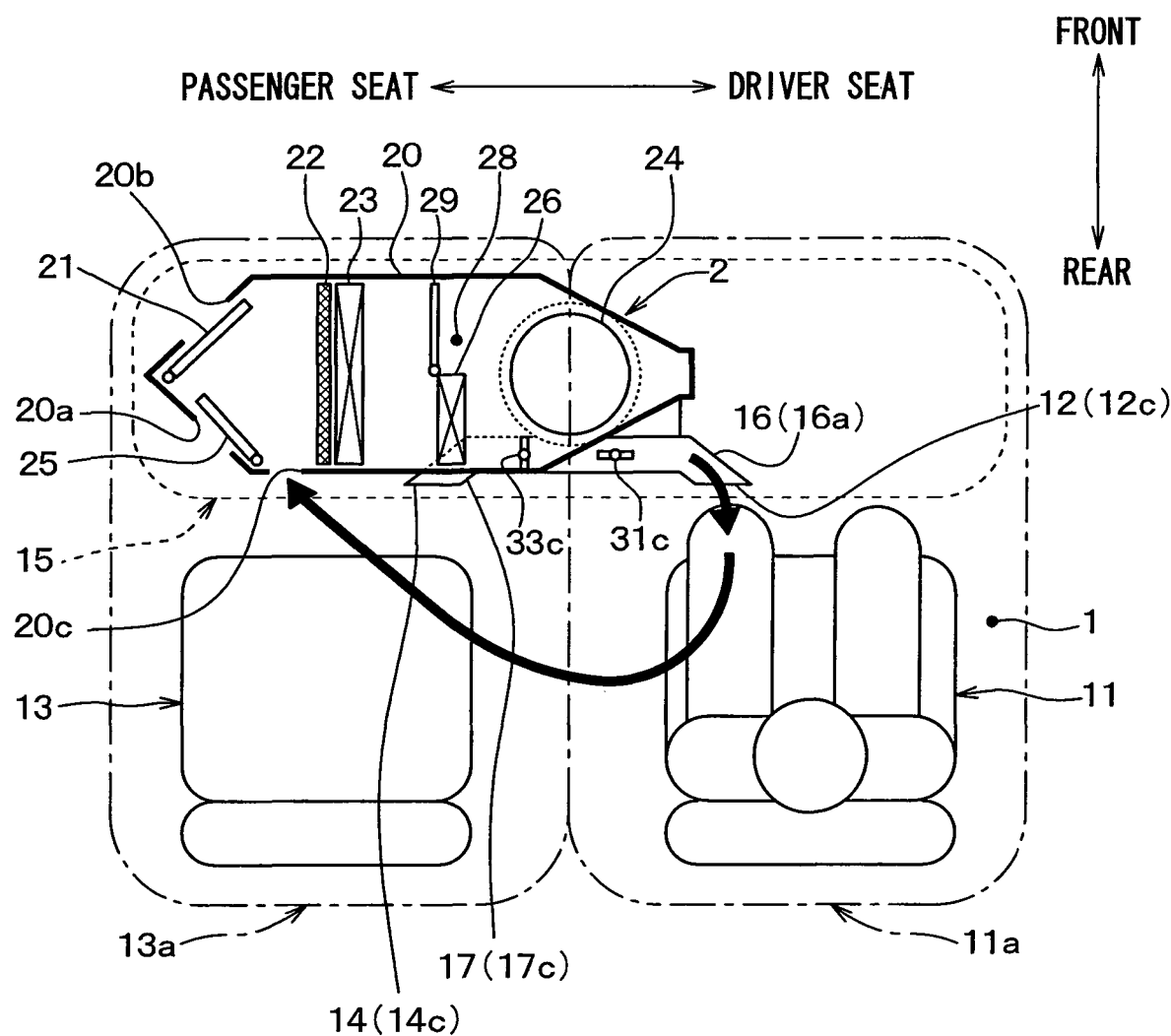
FIG. 18 is a schematic view showing a flow of air during a driver seat heating mode in an air-conditioning device according to a fifth embodiment.

As shown in FIG. 18, a layout of an air-conditioning device 2 of this embodiment is semi-center installation, according to which the air-conditioning device 2 is disposed in a dashboard 15 to extend from a center in a vehicle right-left direction toward a passenger seat 13. A casing 20 of this embodiment is disposed in such a manner that an upstream side in a flow of air is on the side of the passenger seat 13 and a downstream side in the flow of air is at a position in the center in the vehicle right-left direction.

A heater core 26 is disposed downstream of an evaporator 23 in the casing 20 and an air blower 24 is disposed downstream of the heater core 26. The air blower 24 of this embodiment is stored in the casing 20 at a position in the center in the vehicle right-left direction.

An inside air introduction port 20a, an outside air introduction port 20b, and a driver seat inlet port 20c are disposed upstream of a filter 22 and the evaporator 23 on the side of the passenger seat 13.

The driver seat inlet port 20c is provided to the casing 20 in a surface on a rear side of a vehicle at a position closer to a space 11a on the side of a driver seat 11 than the inside air introduction port 20a.

An operation of the air-conditioning device 2 of this embodiment during a heating mode will now be described.

As shown in FIG. 18, during a driver seat heating mode, an outlet mode is set to a foot mode during which air is blown out from a driver seat foot outlet portion 12c.

An inside and outside air switching door 21 closes the outside air introduction port 20b while an inlet opening and closing door 25 closes the inside air introduction port 20a and opens the driver seat inlet port 20c. Hence, as is indicated by thick arrows of FIG. 18, air is drawn in via the driver seat inlet port 20c.

The driver seat inlet port 20c is closer to the space 11a on the side of the driver seat 11 than the inside air introduction port 20a. Hence, air in the space 11a on the side of the driver seat 11 is more readily drawn in than air drawn in via the inside air introduction port 20a.

Air drawn in from the driver seat inlet port 20c is heated in the heater core 26 and subsequently blown out from the driver seat foot outlet portion 12c. The space 11a on the side of the driver seat 11 in a vehicle interior 1 is thus heated intensively.

On the other hand, during a normal heating mode, the outlet mode is set to a foot mode during which air is blown out from the driver seat foot outlet portion 12c and a passenger seat foot outlet portion 14c.

Also, the inlet opening and closing door 25 closes the driver seat inlet port 20c and the inside and outside air switching door 21 opens either the outside air introduction port 20b or the inside air introduction port 20a. Air is thus drawn in via either the outside air introduction port 20b or the inside air introduction port 20a.

Indrawn air is heated in the heater core 26 and subsequently blown out from the driver seat foot outlet portion 12c and the passenger seat foot outlet portion 14c. Both of the space 11a on the side of the driver seat 11 and the space 13a on the side of the passenger seat 13 in the vehicle interior 1 are thus heat.

The air-conditioning device 2 of this embodiment described above has a structure switchable to the driver seat heating mode and the driver seat inlet port 20c is provided to the casing 20. Hence, as with the first embodiment above, the air-conditioning device 2 capable of reducing a heating load can be realized with a simple structure.

Other Embodiment

While the embodiments of the present disclosure have been described, the present disclosure is not limited to the embodiments above and can be modified as needed within the scope of the appended claims. For example, the present disclosure may be modified as follows.

The first through fourth embodiments above have described a case where the driver seat outlet port 20c is provided to the casing 20 in a region near the feet of an occupant seated on the driver seat 11. It should be appreciated, however, that the present disclosure is not limited to the described case. The driver seat inlet port 20c may be provided to the casing 20 in other region exposed to the space 11a on the side of the driver seat 11.

The first and fourth embodiments above have described a case where the electric heater 27 is provided as an auxiliary heating device in addition to the heater core 26. It should be appreciated, however, that the present disclosure is not limited to the described case and the electric heater 27 may be omitted.

In the first through third embodiments and the fifth embodiment above, the driver seat cooling mode may be set as in the fourth embodiment above with the aim of reducing not only a heating load but also a cooling load.

In the respective embodiments above, a humidification device, a deodorization device, an aroma addition device, an air component (for example, ions) addition device, and so on may be provided to an air path from the driver seat inlet port 20c to the driver seat outlet 12 for an occupant seated on the driver seat to receive effects of these devices intensively.

In the respective embodiments above, it goes without saying that elements forming the embodiments are not necessarily essential unless specified as being essential or deemed as being apparently essential in principle.

In a case where a reference is made to the components of the respective embodiments as to numerical values, such as the number, values, amounts, and ranges, the components are not limited to the numerical values unless specified as being essential or deemed as being apparently essential in principle.

Also, in a case where a reference is made to the components of the respective embodiments above as to shapes and positional relations, the components are not limited to the shapes and the positional relations unless explicitly specified or limited to particular shapes and positional relations in principle.

What is claimed is:

1. An air conditioner for a vehicle having a driver seat outlet from which air is blown out toward a driver seat in a vehicle interior and a passenger seat outlet from which air is blown out toward a passenger seat in the vehicle interior, the air conditioner comprising:
   a casing forming an outer shape;
   an air blower stored in the casing to blow air to the vehicle interior by drawing in air from at least one of a plurality of air inlets defined in the casing; and
   a mode switching portion switching an inlet mode to draw air into the casing and an outlet mode to blow out air to the vehicle interior, wherein:
   the plurality of air inlets includes a driver seat inlet port located at a foot portion of the driver seat in a space adjacent to the driver seat from which air in the space adjacent to the driver seat is drawn in;
   the mode switching portion is configured to be switchable between a normal mode during which air drawn in from at least one of the plurality of air inlets is blown out from both of the driver seat outlet and the passenger seat outlet, and a driver seat mode during which air drawn in from the driver seat inlet port is blown out from the driver seat outlet;
   the driver seat inlet port is defined in the casing in a region exposed to the space adjacent to the driver seat;
   the driver seat inlet port from which air is drawn in from the space adjacent to the driver seat is provided to the casing as an air entry other than an inside air introduction port and an outside air introduction port;
   the driver seat inlet port is open in the casing at the foot portion of the driver seat, is disposed in a portion of the casing surrounding the air blower, and is located at a position closer to the driver seat than the inside air introduction port; and
   the plurality of air inlets are disposed outside of the driver seat and the passenger seat.

2. The air conditioner according to claim 1, wherein:
   the casing is disposed in such a manner that at least a part of the casing is at a position in a center in a vehicle right-left direction;
   the air blower is stored in the casing at a position in the center in the vehicle right-left direction; and
   the driver seat inlet port is defined in the casing in a region at a position in the center in the vehicle right-left direction.

3. The air conditioner according to claim 1, further comprising:
   a heating portion stored in the casing to heat air to be sent to the vehicle interior; and
   a cooling portion disposed upstream of the heating portion in a flow of air in the casing to cool air to be sent to the vehicle interior, wherein:
   the air blower is disposed downstream of the cooling portion in the flow of air in the casing; and
   the driver seat inlet port is defined in the casing in a region downstream of the cooling portion in the flow of air.

4. An air conditioner for a vehicle having a driver seat outlet from which air is blown out toward a driver seat in a vehicle interior and a passenger seat outlet from which air is blown out toward a passenger seat in the vehicle interior, the air conditioner comprising:
   a casing forming an outer shape;
   an air blower stored in the casing to blow air to the vehicle interior by drawing in air from at least one of a plurality of air inlets defined in the casing; and
   a mode switching portion switching an inlet mode to draw air into the casing and an outlet mode to blow out air to the vehicle interior, wherein:
   the plurality of air inlets includes an inside air introduction port disposed in a space adjacent to the passenger seat, from which air in the vehicle interior is drawn in, and a driver seat inlet port disposed at a foot portion of the driver seat at a position closer to a space adjacent to the driver seat than the inside air introduction port, from which air in the vehicle interior is drawn in;
   the mode switching portion is configured to be switchable between a normal mode during which air drawn in from at least one of the plurality of air inlets is blown out from both of the driver seat outlet and the passenger seat outlet and a driver seat mode during which air drawn in from the driver seat inlet port is blown out from the driver seat outlet;
   the driver seat inlet port from which air is drawn in from the space adjacent to the driver seat is provided to the casing as an air entry other than the inside air introduction port and an outside air introduction port;
   the driver seat inlet port is open in the casing at the foot portion of the driver seat, is disposed in a portion of the casing surrounding the air blower, and is located at a position closer to the driver seat than the inside air introduction port; and
   the plurality of air inlets are disposed outside of the driver seat and the passenger seat.

5. The air conditioner according to claim 4, further comprising:
   a heating portion stored in the casing to heat air to be sent to the vehicle interior, wherein:
   the heating portion includes an electric heater which generates heat when energized; and
   the electric heater is disposed in an air passage from the driver seat inlet port to the driver seat outlet in the casing.

6. The air conditioner according to claim 4, wherein:
   the driver seat outlet has a driver seat foot outlet portion from which air is blown out toward a lower portion of the driver seat and a driver seat face outlet portion from which air is blown out toward an upper half of the driver seat; and the driver seat inlet port is defined in the casing in a region below the driver seat face outlet portion.

7. An air conditioner for a vehicle having a driver seat outlet from which air is blown out toward a driver seat in a vehicle interior and a passenger seat outlet from which air is blown out toward a passenger seat in the vehicle interior, the air conditioner comprising:
 a casing forming an outer shape;
 an air blower stored in the casing to blow air to the vehicle interior by drawing in air from at least one of a plurality of air inlets defined in the casing; and
 a mode switching portion switching an inlet mode to draw air into the casing and an outlet mode to blow out air to the vehicle interior, wherein:
 the plurality of air inlets includes an inside air introduction port disposed in a space adjacent to the passenger seat, from which air in the vehicle interior is drawn in, and a driver seat inlet port disposed at a foot portion of the driver seat at a position closer to a space adjacent to the driver seat than the inside air introduction port, from which only air in the vehicle interior is drawn in;
 the mode switching portion is configured to be switchable between a normal mode during which air drawn in from at least one of the plurality of air inlets is blown out from both of the driver seat outlet and the passenger seat outlet, and a driver seat mode during which air drawn in from the driver seat inlet port is blown out from the driver seat outlet;
 the driver seat inlet port from which air is drawn in from the space adjacent to the driver seat is provided to the casing as an air entry other than the inside air introduction port and an outside air introduction port;
 the driver seat inlet port is open in the casing at the foot portion of the driver seat, is disposed in a portion of the casing surrounding the air blower, and is located at a position closer to the driver seat than the inside air introduction port; and
 the plurality of air inlets are disposed outside of the driver seat and the passenger seat.

8. The air conditioner according to claim 7, wherein:
 the casing is disposed in such a manner that at least a part of the casing is at a position in a center in a vehicle right-left direction;
 the air blower is stored in the casing at a position in the center in the vehicle right-left direction; and
 the driver seat inlet port is defined in the casing in a region at a position in the center in the vehicle right-left direction.

9. The air conditioner according to claim 7, further comprising:
 a heating portion stored in the casing to heat air to be sent to the vehicle interior; and
 a cooling portion disposed upstream of the heating portion in a flow of air in the casing to cool air to be sent to the vehicle interior, wherein:
 the air blower is disposed downstream of the cooling portion in the flow of air in the casing; and
 the driver seat inlet port is defined in the casing in a region downstream of the cooling portion in the flow of air.

10. The air conditioner according to claim 1, wherein the inside air introduction port is provided to the casing to introduce inside air from a space adjacent to the passenger seat.

11. The air conditioner according to claim 1, wherein the driver seat inlet port is disposed at a position closer to the space adjacent to the driver seat than the inside air introduction port.

12. The air conditioner according to claim 1, wherein the inside air introduction port and the outside air introduction port are located at an upstream end of the casing.

* * * * *